US006747781B2

(12) United States Patent
Trisnadi

(10) Patent No.: US 6,747,781 B2
(45) Date of Patent: Jun. 8, 2004

(54) METHOD, APPARATUS, AND DIFFUSER FOR REDUCING LASER SPECKLE

(75) Inventor: Jahja I. Trisnadi, Cupertino, CA (US)

(73) Assignee: Silicon Light Machines, Inc., Sunnyvale, CA (US)

(*) Notice: Subject to any disclaimer, the term of this patent is extended or adjusted under 35 U.S.C. 154(b) by 319 days.

(21) Appl. No.: 09/898,882

(22) Filed: Jul. 2, 2001

(65) Prior Publication Data

US 2004/0008399 A1 Jan. 15, 2004

Related U.S. Application Data

(60) Provisional application No. 60/301,053, filed on Jun. 25, 2001.

(51) Int. Cl.[7] .............................. G02F 1/01; G02F 1/29; G02B 27/46
(52) U.S. Cl. ...................... 359/279; 359/316; 359/559
(58) Field of Search .............................. 359/279, 316, 359/559, 627; 356/237.5; 372/9, 26

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins ........................ 359/291 |
| 1,814,701 A | 7/1931 | Ives |
| 2,415,226 A | 2/1947 | Sziklai ........................ 178/5.4 |
| 2,783,406 A | 2/1957 | Vanderhooft ................. 313/70 |
| 2,920,529 A | 1/1960 | Blythe .......................... 88/73 |
| 2,991,690 A | 7/1961 | Grey et al. ................... 88/16.6 |
| RE25,169 E | 5/1962 | Glenn .......................... 348/764 |
| 3,256,465 A | 6/1966 | Weissenstern et al. ...... 317/101 |
| 3,388,301 A | 6/1968 | James .......................... 317/234 |
| 3,443,871 A | 5/1969 | Chitayat ....................... 356/106 |
| 3,553,364 A | 1/1971 | Lee ............................ 178/7.3 |
| 3,576,394 A | 4/1971 | Lee ............................ 178/7.3 |

(List continued on next page.)

FOREIGN PATENT DOCUMENTS

| | | | |
|---|---|---|---|
| WO | WO 98/24240 | 6/1998 | ............ H04N/9/31 |
| WO | WO 03/001281 A1 * | 1/2003 | ............. G02F/1/01 |

OTHER PUBLICATIONS

Juris Upatnieks, "Improvement of Two–Dimensional Image Quality in Coherent Optical Systems", Applied Optics, Nov. 1967, vol. 6. No. 11, pp. 1905–1910.
T.S. McKechnie, "Speckle Reduction", pp. 122–170.

(List continued on next page.)

Primary Examiner—David N. Spector
(74) Attorney, Agent, or Firm—Haverstock & Owens LLP

(57) ABSTRACT

A method of reducing speckle includes dividing a laser illuminated area into phase cells, subdividing the phase cells into cell partitions, and applying a temporal phase variation to the cell partitions within an integration time of an intensity detector viewing the laser illuminated area. An apparatus for reducing speckle includes illumination optics, a diffuser, and projection optics. The illumination optics couple a laser illumination to the diffuser, which is located in a first image plane. The diffuser divides the laser illumination into the phase cells and subdivides the phase cells into the cell partitions. The diffuser also applies the temporal phase variation to the cell partitions. The projection optics project an image of the first image plane onto a diffuse surface. A display apparatus adds a light modulator to the apparatus for reducing speckle and places the light modulator in a third image plane located between a laser source and the diffuser. The diffuser includes first and second diffuser cells, each of which include first and second diffuser cell partitions. In use, the first diffuser cell partitions induce a first relative phase of zero while the second diffuser cell partitions induce a second relative phase of pi radians. The first and second diffuser cell partitions of the first diffuser cells are preferably arranged in a first Hadamard matrix pattern. The first and second diffuser cell partitions of the second diffuser cell are preferably arranged in a second Hadamard matrix pattern.

41 Claims, 18 Drawing Sheets

U.S. PATENT DOCUMENTS

| | | | |
|---|---|---|---|
| 3,600,798 A | 8/1971 | Lee | 29/592 |
| 3,656,837 A | 4/1972 | Sandbank | 350/161 |
| 3,657,610 A | 4/1972 | Yamamoto et al. | 317/243 |
| 3,693,239 A | 9/1972 | Dix | 29/470 |
| 3,743,507 A | 7/1973 | Ih et al. | 96/81 |
| 3,752,563 A | 8/1973 | Torok et al. | 350/151 |
| 3,781,465 A | 12/1973 | Ernstoff et al. | 178/5.4 BD |
| 3,783,184 A | 1/1974 | Ernstoff et al. | 178/5.4 BD |
| 3,792,916 A | 2/1974 | Sarna | 350/163 |
| 3,802,769 A | 4/1974 | Rotz et al. | 352/43 |
| 3,811,186 A | 5/1974 | Larnerd et al. | 29/626 |
| 3,861,784 A | 1/1975 | Torok | 350/162 R |
| 3,862,360 A | 1/1975 | Dill et al. | 178/7.3 D |
| 3,871,014 A | 3/1975 | King et al. | 357/67 |
| 3,886,310 A | 5/1975 | Guldberg et al. | 178/7.5 D |
| 3,896,338 A | 7/1975 | Nathanson et al. | 315/373 |
| 3,915,548 A | 10/1975 | Opittek | 350/3.5 |
| 3,935,499 A | 1/1976 | Oess | 313/413 |
| 3,935,500 A | 1/1976 | Oess et al. | 313/495 |
| 3,938,881 A | 2/1976 | Biegelsen et al. | 350/161 |
| 3,941,456 A | 3/1976 | Schilz et al. | 359/305 |
| 3,942,245 A | 3/1976 | Jackson et al. | 29/591 |
| 3,943,281 A | 3/1976 | Keller et al. | 178/7.5 D |
| 3,947,105 A | 3/1976 | Smith | 353/121 |
| 3,969,611 A | 7/1976 | Fonteneau | 219/502 |
| 3,980,476 A | 9/1976 | Wysocki | 96/1.1 |
| 3,991,416 A | 11/1976 | Byles et al. | 340/324 R |
| 4,001,663 A | 1/1977 | Bray | 321/2 |
| 4,004,849 A | 1/1977 | Shattuck | 350/160 R |
| 4,006,968 A | 2/1977 | Ernstoff et al. | 350/160 LC |
| 4,009,939 A | 3/1977 | Okano | 350/162 SF |
| 4,011,009 A | 3/1977 | Lama et al. | 350/162 R |
| 4,012,116 A | 3/1977 | Yevick | 350/132 |
| 4,012,835 A | 3/1977 | Wallick | 29/591 |
| 4,017,158 A | 4/1977 | Booth | 350/162 SF |
| 4,020,381 A | 4/1977 | Oess et al. | 313/302 |
| 4,021,766 A | 5/1977 | Aine | 338/2 |
| 4,034,211 A | 7/1977 | Horst et al. | 235/61.12 N |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 359/446 |
| 4,163,570 A | 8/1979 | Greenaway | 283/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 466/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A | 4/1985 | Scully | 359/495 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe et al. | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |

| Patent | Date | Inventor | Ref |
|---|---|---|---|
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.3 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbeck | 359/224 |
| 5,066,614 A | 11/1991 | Dunaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 357/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |

| Patent No. | Date | Inventor | Class |
|---|---|---|---|
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,185,823 A | 2/1993 | Kaku et al. | |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| D334,557 S | 4/1993 | Hunter et al. | D14/114 |
| D334,742 S | 4/1993 | Hunter et al. | D14/113 |
| 5,202,785 A | 4/1993 | Nelson | 359/214 |
| 5,206,629 A | 4/1993 | DeMond et al. | 340/719 |
| 5,206,829 A | 4/1993 | Thakoor et al. | |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiguchi et al. | 257/692 |
| 5,214,419 A | 5/1993 | DeMond et al. | 340/794 |
| 5,214,420 A | 5/1993 | Thompson et al. | 340/795 |
| 5,216,278 A | 6/1993 | Lin et al. | |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| D337,320 S | 7/1993 | Hunter et al. | D14/113 |
| 5,226,099 A | 7/1993 | Mignardi et al. | 385/19 |
| 5,230,005 A | 7/1993 | Rubino et al. | 372/20 |
| 5,231,363 A | 7/1993 | Sano et al. | 332/109 |
| 5,231,388 A | 7/1993 | Stoltz | 340/783 |
| 5,231,432 A | 7/1993 | Glenn | 353/31 |
| 5,233,456 A | 8/1993 | Nelson | 359/214 |
| 5,233,460 A | 8/1993 | Partlo et al. | 359/247 |
| 5,233,874 A | 8/1993 | Putty et al. | 73/517 AV |
| 5,237,340 A | 8/1993 | Nelson | 346/108 |
| 5,237,435 A | 8/1993 | Kurematsu et al. | 359/41 |
| 5,239,448 A | 8/1993 | Perkins et al. | 361/764 |
| 5,239,806 A | 8/1993 | Maslakow | 53/432 |
| 5,240,818 A | 8/1993 | Mignardi et al. | 430/321 |
| 5,245,686 A | 9/1993 | Faris et al. | 385/120 |
| 5,247,180 A | 9/1993 | Mitcham et al. | 250/492.1 |
| 5,247,593 A | 9/1993 | Lin et al. | 385/17 |
| 5,249,245 A | 9/1993 | Lebby et al. | 385/89 |
| 5,251,057 A | 10/1993 | Guerin et al. | 359/249 |
| 5,251,058 A | 10/1993 | MacArthur | 359/249 |
| 5,254,980 A | 10/1993 | Hendrix et al. | 345/84 |
| 5,255,100 A | 10/1993 | Urbanus | 358/231 |
| 5,256,869 A | 10/1993 | Lin et al. | 250/201.9 |
| 5,258,325 A | 11/1993 | Spitzer et al. | 437/86 |
| 5,260,718 A | 11/1993 | Rommelmann et al. | 346/107 R |
| 5,260,798 A | 11/1993 | Um et al. | 358/233 |
| 5,262,000 A | 11/1993 | Welbourn et al. | 156/643 |
| 5,272,473 A | 12/1993 | Thompson et al. | 345/7 |
| 5,278,652 A | 1/1994 | Urbanus et al. | 358/160 |
| 5,278,925 A | 1/1994 | Boysel et al. | 385/14 |
| 5,280,277 A | 1/1994 | Hornbeck | 345/108 |
| 5,281,887 A | 1/1994 | Engle | 310/335 |
| 5,281,957 A | 1/1994 | Schoolman | 345/8 |
| 5,285,105 A | 2/1994 | Cain | 257/672 |
| 5,285,196 A | 2/1994 | Gale, Jr. | 345/108 |
| 5,285,407 A | 2/1994 | Gale et al. | 365/189.11 |
| 5,287,096 A | 2/1994 | Thompson et al. | 345/147 |
| 5,287,215 A | 2/1994 | Warde et al. | 359/293 |
| 5,289,172 A | 2/1994 | Gale, Jr. et al. | 345/108 |
| 5,291,317 A | 3/1994 | Newswanger | 359/15 |
| 5,291,473 A | 3/1994 | Pauli | 369/112 |
| 5,293,511 A | 3/1994 | Poradish et al. | 257/434 |
| 5,296,408 A | 3/1994 | Wilbarg et al. | 437/203 |
| 5,296,891 A | 3/1994 | Vogt et al. | 355/67 |
| 5,296,950 A | 3/1994 | Lin et al. | 359/9 |
| 5,298,460 A | 3/1994 | Nishiguchi et al. | 437/183 |
| 5,299,037 A | 3/1994 | Sakata | 359/41 |
| 5,299,289 A | 3/1994 | Omae et al. | 359/95 |
| 5,300,813 A | 4/1994 | Joshi et al. | 257/752 |
| 5,301,062 A | 4/1994 | Takahashi et al. | 359/567 |
| 5,303,043 A | 4/1994 | Glenn | 348/40 |
| 5,303,055 A | 4/1994 | Hendrix et al. | 348/761 |
| 5,307,056 A | 4/1994 | Urbanus | 340/189 |
| 5,307,185 A | 4/1994 | Jones et al. | 359/41 |
| 5,310,624 A | 5/1994 | Ehrlich | 430/322 |
| 5,311,349 A | 5/1994 | Anderson et al. | 359/223 |
| 5,311,360 A | 5/1994 | Bloom et al. | 359/572 |
| 5,312,513 A | 5/1994 | Florence et al. | 156/643 |
| 5,313,479 A | 5/1994 | Florence | 372/26 |
| 5,313,648 A | 5/1994 | Ehlig et al. | 395/800 |
| 5,313,835 A | 5/1994 | Dunn | 73/505 |
| 5,315,418 A | 5/1994 | Sprague et al. | 359/41 |
| 5,315,423 A | 5/1994 | Hong | 359/124 |
| 5,319,214 A | 6/1994 | Gregory et al. | 250/504 R |
| 5,319,668 A | 6/1994 | Luecke | 372/107 |
| 5,319,789 A | 6/1994 | Ehlig et al. | 395/800 |
| 5,319,792 A | 6/1994 | Ehlig et al. | 395/800 |
| 5,320,709 A | 6/1994 | Bowden et al. | |
| 5,321,416 A | 6/1994 | Bassett et al. | 345/8 |
| 5,323,002 A | 6/1994 | Sampsell et al. | 250/252.1 |
| 5,323,051 A | 6/1994 | Adams et al. | 257/417 |
| 5,325,116 A | 6/1994 | Sampsell | 346/108 |
| 5,327,286 A | 7/1994 | Sampsell et al. | 359/561 |
| 5,329,289 A | 7/1994 | Sakamoto et al. | 345/126 |
| 5,330,301 A | 7/1994 | Brancher | 414/417 |
| 5,330,878 A | 7/1994 | Nelson | 430/311 |
| 5,331,454 A | 7/1994 | Hornbeck | 359/224 |
| 5,334,991 A | 8/1994 | Wells et al. | 345/8 |
| 5,339,116 A | 8/1994 | Urbanus et al. | 348/716 |
| 5,339,177 A | 8/1994 | Jenkins et al. | 359/35 |
| 5,340,772 A | 8/1994 | Rosotker | 437/226 |
| 5,345,521 A | 9/1994 | McDonald et al. | 385/19 |
| 5,347,321 A | 9/1994 | Gove | 348/663 |
| 5,347,378 A | 9/1994 | Handschy et al. | 359/53 |
| 5,347,433 A | 9/1994 | Sedlmayr | 362/32 |
| 5,348,619 A | 9/1994 | Bohannon et al. | 156/664 |
| 5,349,687 A | 9/1994 | Ehlig et al. | 395/800 |

| | | | | | | |
|---|---|---|---|---|---|---|
| 5,351,052 A | 9/1994 | D'Hont et al. ............... 342/42 | | 5,461,411 A | 10/1995 | Florence et al. ............ 347/240 |
| 5,352,926 A | 10/1994 | Andrews ................... 257/717 | | 5,461,547 A | 10/1995 | Ciupke et al. ................ 362/31 |
| 5,354,416 A | 10/1994 | Okudaira et al. ........... 156/643 | | 5,463,347 A | 10/1995 | Jones et al. ................. 330/253 |
| 5,357,369 A | 10/1994 | Pilling et al. ............... 359/462 | | 5,463,497 A | 10/1995 | Muraki et al. .............. 359/618 |
| 5,357,803 A | 10/1994 | Lane ...................... 73/517 B | | 5,465,175 A | 11/1995 | Woodgate et al. .......... 359/463 |
| 5,359,349 A | 10/1994 | Jambor et al. .............. 345/168 | | 5,467,106 A | 11/1995 | Salomon ....................... 345/87 |
| 5,359,451 A | 10/1994 | Gelbart et al. .............. 359/285 | | 5,467,138 A | 11/1995 | Gove ......................... 348/452 |
| 5,361,131 A | 11/1994 | Tekemori et al. ........... 356/499 | | 5,467,146 A | 11/1995 | Huang et al. ............... 348/743 |
| 5,363,220 A | 11/1994 | Kuwayama et al. ........... 359/3 | | 5,469,302 A | 11/1995 | Lim .......................... 359/846 |
| 5,365,283 A | 11/1994 | Doherty et al. ............. 348/743 | | 5,471,341 A | 11/1995 | Warde et al. ............... 359/293 |
| 5,367,585 A | 11/1994 | Ghezzo et al. ................ 385/23 | | 5,473,512 A | 12/1995 | Degani et al. .............. 361/760 |
| 5,370,742 A | 12/1994 | Mitchell et al. .............. 134/10 | | 5,475,236 A | 12/1995 | Yoshizaki .................... 257/48 |
| 5,371,543 A | 12/1994 | Anderson ................... 348/270 | | 5,480,839 A | 1/1996 | Ezawa et al. ............... 437/209 |
| 5,371,618 A | 12/1994 | Tai et al. ..................... 359/53 | | 5,481,118 A | 1/1996 | Tew .......................... 250/551 |
| 5,377,705 A | 1/1995 | Smith, Jr. et al. .......... 134/95.3 | | 5,481,133 A | 1/1996 | Hsu .......................... 257/621 |
| 5,382,961 A | 1/1995 | Gale, Jr. ..................... 345/108 | | 5,482,564 A | 1/1996 | Douglas et al. ............... 134/18 |
| 5,387,924 A | 2/1995 | Gale, Jr. et al. ............ 345/108 | | 5,482,818 A | 1/1996 | Nelson ........................ 430/394 |
| 5,389,182 A | 2/1995 | Mignardi ................... 156/344 | | 5,483,307 A | 1/1996 | Anderson ................... 353/98 |
| 5,391,881 A | 2/1995 | Jeuch et al. ........... 250/370.09 | | 5,485,172 A | 1/1996 | Sawachika et al. ............ 345/8 |
| 5,392,140 A | 2/1995 | Ezra et al. ................... 359/41 | | 5,485,304 A | 1/1996 | Kaeriyama ................. 359/291 |
| 5,392,151 A | 2/1995 | Nelson ....................... 359/223 | | 5,485,354 A | 1/1996 | Ciupke et al. ................ 362/31 |
| 5,394,303 A | 2/1995 | Yamaji ....................... 361/749 | | 5,486,698 A | 1/1996 | Hanson et al. .............. 250/332 |
| 5,398,071 A | 3/1995 | Gove et al. ................. 348/558 | | 5,486,841 A | 1/1996 | Hara et al. ...................... 345/8 |
| 5,399,898 A | 3/1995 | Rostoker ..................... 257/499 | | 5,486,946 A | 1/1996 | Jachimowicz et al. ...... 359/263 |
| 5,404,365 A | 4/1995 | Hiiro ............................. 372/27 | | 5,488,431 A | 1/1996 | Gove et al. ................. 348/716 |
| 5,404,485 A | 4/1995 | Ban ............................. 395/425 | | 5,489,952 A | 2/1996 | Gove et al. ................. 348/771 |
| 5,408,123 A | 4/1995 | Murai ......................... 257/531 | | 5,490,009 A | 2/1996 | Venkateswar et al. ...... 359/291 |
| 5,410,315 A | 4/1995 | Huber ........................... 342/42 | | 5,491,510 A | 2/1996 | Gove ............................ 348/77 |
| 5,411,769 A | 5/1995 | Hornbeck ................... 427/534 | | 5,491,612 A | 2/1996 | Nicewarner, Jr. ........... 361/760 |
| 5,412,186 A | 5/1995 | Gale ........................... 219/679 | | 5,491,715 A | 2/1996 | Flaxl .......................... 375/344 |
| 5,412,501 A | 5/1995 | Fisli ........................... 359/286 | | 5,493,177 A | 2/1996 | Muller et al. ............... 313/578 |
| 5,418,584 A | 5/1995 | Larson ....................... 353/122 | | 5,493,439 A | 2/1996 | Engle ......................... 359/292 |
| 5,420,655 A | 5/1995 | Shimizu ....................... 353/33 | | 5,497,172 A | 3/1996 | Doherty et al. ............... 345/85 |
| 5,420,722 A | 5/1995 | Bielak ........................ 359/708 | | 5,497,197 A | 3/1996 | Gove et al. ................. 348/388 |
| 5,426,072 A | 6/1995 | Finnila ....................... 437/208 | | 5,497,262 A | 3/1996 | Kaeriyama ................. 359/223 |
| 5,427,975 A | 6/1995 | Sparks et al. ................. 437/79 | | 5,499,060 A | 3/1996 | Gove et al. ................. 348/651 |
| 5,430,524 A | 7/1995 | Nelson ....................... 355/200 | | 5,499,062 A | 3/1996 | Urbanus ..................... 348/771 |
| 5,435,876 A | 7/1995 | Alfaro et al. ............... 156/247 | | 5,500,761 A | 3/1996 | Goossen et al. ............ 359/290 |
| 5,438,477 A | 8/1995 | Pasch ......................... 361/689 | | 5,502,481 A | 3/1996 | Dentinger et al. ............ 348/51 |
| 5,439,731 A | 8/1995 | Li et al. ...................... 428/209 | | 5,504,504 A | 4/1996 | Markandey et al. ........ 345/214 |
| 5,442,411 A | 8/1995 | Urbanus et al. ............ 348/771 | | 5,504,514 A | 4/1996 | Nelson ....................... 347/130 |
| 5,442,414 A | 8/1995 | Janssen et al. ................ 353/98 | | 5,504,575 A | 4/1996 | Stafford ...................... 356/330 |
| 5,444,566 A | 8/1995 | Gale et al. .................. 359/291 | | 5,504,614 A | 4/1996 | Webb et al. ................ 359/223 |
| 5,445,559 A | 8/1995 | Gale et al. .................. 451/388 | | 5,506,171 A | 4/1996 | Leonard et al. ............. 437/187 |
| 5,446,479 A | 8/1995 | Thompson et al. ......... 345/139 | | 5,506,597 A | 4/1996 | Thompson et al. ........... 345/85 |
| 5,447,600 A | 9/1995 | Webb ............................ 216/2 | | 5,506,720 A | 4/1996 | Yoon ......................... 359/224 |
| 5,448,314 A | 9/1995 | Heimbuch et al. .......... 348/743 | | 5,508,558 A | 4/1996 | Robinette, Jr. et al. ..... 257/700 |
| 5,448,546 A | 9/1995 | Pauli .......................... 369/112 | | 5,508,561 A | 4/1996 | Tago et al. .................. 257/737 |
| 5,450,088 A | 9/1995 | Meier et al. .................. 342/51 | | 5,508,565 A | 4/1996 | Hatakeyama et al. ....... 257/777 |
| 5,450,219 A | 9/1995 | Gold et al. .................. 359/291 | | 5,508,750 A | 4/1996 | Hewlett et al. ............. 348/558 |
| 5,451,103 A | 9/1995 | Hatanaka et al. ............. 353/31 | | 5,508,840 A | 4/1996 | Vogel et al. ................ 359/291 |
| 5,452,024 A | 9/1995 | Sampsell ..................... 348/755 | | 5,508,841 A | 4/1996 | Lin et al. .................... 359/318 |
| 5,452,138 A | 9/1995 | Mignardi et al. ........... 359/855 | | 5,510,758 A | 4/1996 | Fujita et al. ................ 333/247 |
| 5,453,747 A | 9/1995 | D'Hont et al. ................ 342/42 | | 5,510,824 A | 4/1996 | Nelson ....................... 347/239 |
| 5,453,778 A | 9/1995 | Venkateswar et al. ...... 347/239 | | 5,512,374 A | 4/1996 | Wallace et al. ............. 428/422 |
| 5,453,803 A | 9/1995 | Shapiro et al. .............. 353/119 | | 5,512,748 A | 4/1996 | Hanson ...................... 250/332 |
| 5,454,160 A | 10/1995 | Nickel .......................... 29/840 | | 5,515,076 A | 5/1996 | Thompson et al. ......... 345/139 |
| 5,454,906 A | 10/1995 | Baker et al. .................. 216/66 | | 5,516,125 A | 5/1996 | McKenna ...................... 279/3 |
| 5,455,445 A | 10/1995 | Kurtz et al. ................. 257/419 | | 5,517,340 A | 5/1996 | Doany et al. ............... 359/41 |
| 5,455,455 A | 10/1995 | Badehi ........................ 257/690 | | 5,517,347 A | 5/1996 | Sampsell .................... 359/224 |
| 5,455,602 A | 10/1995 | Tew ............................ 347/239 | | 5,517,357 A | 5/1996 | Shibayama ................. 359/547 |
| 5,457,493 A | 10/1995 | Leddy et al. ................ 348/164 | | 5,517,359 A | 5/1996 | Gelbart ....................... 359/623 |
| 5,457,566 A | 10/1995 | Sampsell et al. ............ 359/292 | | 5,519,251 A | 5/1996 | Sato et al. ................... 257/666 |
| 5,457,567 A | 10/1995 | Shinohara ................... 359/305 | | 5,519,450 A | 5/1996 | Urbanus et al. ............ 348/600 |
| 5,458,716 A | 10/1995 | Alfaro et al. ............... 156/245 | | 5,521,748 A | 5/1996 | Sarraf ......................... 359/321 |
| 5,459,492 A | 10/1995 | Venkateswar ............... 347/253 | | 5,523,619 A | 6/1996 | McAllister et al. ......... 257/686 |
| 5,459,528 A | 10/1995 | Pettitt ......................... 348/568 | | 5,523,628 A | 6/1996 | Williams et al. ............ 257/777 |
| 5,459,592 A | 10/1995 | Shibatani et al. .............. 359/40 | | 5,523,803 A | 6/1996 | Urbanus et al. ............ 348/771 |
| 5,459,610 A | 10/1995 | Bloom et al. ............... 359/572 | | 5,523,878 A | 6/1996 | Wallace et al. ............. 359/290 |
| 5,461,197 A | 10/1995 | Hiruta et al. ............... 174/52.4 | | 5,523,881 A | 6/1996 | Florence et al. ............ 359/561 |
| 5,461,410 A | 10/1995 | Venkateswar et al. ...... 347/240 | | 5,523,920 A | 6/1996 | Machuga et al. ........... 361/767 |

| | | | |
|---|---|---|---|
| 5,524,155 A | 6/1996 | Weaver ................. 385/24 |
| 5,526,834 A | 6/1996 | Mielnik et al. ........... 134/105 |
| 5,534,107 A | 7/1996 | Gray et al. ............. 156/643.1 |
| 5,534,386 A | 7/1996 | Petersen et al. ........... 430/320 |
| 5,534,883 A | 7/1996 | Koh ....................... 345/3 |
| 5,539,422 A | 7/1996 | Heacock et al. ............. 345/8 |
| 5,544,306 A | 8/1996 | Deering et al. ............. 395/164 |
| 5,552,635 A | 9/1996 | Kim et al. |
| 5,554,304 A | 9/1996 | Suzuki ................. 216/2 |
| 5,576,878 A | 11/1996 | Henck ................... 359/224 |
| 5,602,671 A | 2/1997 | Hornbeck ................ 359/224 |
| 5,606,181 A | 2/1997 | Sakuma et al. ............ 257/88 |
| 5,606,447 A | 2/1997 | Asada et al. ............. 359/199 |
| 5,610,438 A | 3/1997 | Wallace et al. ........... 257/682 |
| 5,623,361 A | 4/1997 | Engle .................. 359/291 |
| 5,629,566 A | 5/1997 | Doi et al. .............. 257/789 |
| 5,629,801 A | 5/1997 | Staker et al. ............ 359/572 |
| 5,640,216 A | 6/1997 | Hasegawa et al. ........... 349/58 |
| 5,658,698 A | 8/1997 | Yagi et al. ............... 430/11 |
| 5,661,592 A | 8/1997 | Bornstein et al. .......... 359/291 |
| 5,661,593 A | 8/1997 | Engle .................. 359/292 |
| 5,663,817 A | 9/1997 | Frapin et al. ............. 349/5 |
| 5,668,611 A | 9/1997 | Ernstoff et al. ........... 348/771 |
| 5,673,139 A | 9/1997 | Johnson ................. 359/291 |
| 5,677,783 A | 10/1997 | Bloom et al. ............ 359/224 |
| 5,689,361 A | 11/1997 | Damen et al. ........... 359/284 |
| 5,691,836 A | 11/1997 | Clark .................. 359/247 |
| 5,694,740 A | 12/1997 | Martin et al. ............. 53/431 |
| 5,696,560 A | 12/1997 | Songer ................. 348/436 |
| 5,699,740 A | 12/1997 | Gelbart ................ 101/477 |
| 5,704,700 A | 1/1998 | Kappel et al. ............. 353/31 |
| 5,707,160 A | 1/1998 | Bowen ................. 400/472 |
| 5,712,649 A | 1/1998 | Tosaki ................. 345/8 |
| 5,713,652 A | 2/1998 | Zavracky et al. .......... 353/122 |
| 5,726,480 A | 3/1998 | Pister ................. 257/415 |
| 5,731,802 A | 3/1998 | Aras et al. .............. 345/148 |
| 5,734,224 A | 3/1998 | Tagawa et al. ............ 313/493 |
| 5,742,373 A | 4/1998 | Alvelda ................ 349/204 |
| 5,744,752 A | 4/1998 | McHerron et al. ......... 174/52.4 |
| 5,745,271 A | 4/1998 | Ford et al. .............. 359/130 |
| 5,757,354 A | 5/1998 | Kawamura ............... 345/126 |
| 5,757,536 A | 5/1998 | Ricco et al. .............. 359/224 |
| 5,764,280 A | 6/1998 | Bloom et al. .............. 348/53 |
| 5,768,009 A | 6/1998 | Little .................. 359/293 |
| 5,773,473 A | 6/1998 | Hall et al. ............... 438/26 |
| 5,793,519 A | 8/1998 | Furlani et al. ........... 359/291 |
| 5,798,743 A | 8/1998 | Bloom .................. 345/90 |
| 5,798,805 A | 8/1998 | Ooi et al. ............... 349/10 |
| 5,801,074 A | 9/1998 | Kim et al. ............... 438/125 |
| 5,802,222 A | 9/1998 | Rasch et al. ............. 385/1 |
| 5,808,323 A | 9/1998 | Spaeth et al. ............ 257/88 |
| 5,808,797 A | 9/1998 | Bloom et al. ............ 359/572 |
| 5,815,126 A | 9/1998 | Fan et al. ............... 345/8 |
| 5,825,443 A | 10/1998 | Kawasaki et al. ........... 349/95 |
| 5,832,148 A | 11/1998 | Yariv |
| 5,835,255 A | 11/1998 | Miles ................. 359/291 |
| 5,835,256 A | 11/1998 | Huibers ............... 359/291 |
| 5,837,562 A | 11/1998 | Cho .................... 438/51 |
| 5,841,579 A | 11/1998 | Bloom et al. ........... 359/572 |
| 5,841,929 A | 11/1998 | Komatsu et al. |
| 5,844,711 A | 12/1998 | Long, Jr. ............... 359/291 |
| 5,847,859 A | 12/1998 | Murata ................ 359/201 |
| 5,862,164 A | 1/1999 | Hill .................... 372/27 |
| 5,868,854 A | 2/1999 | Kojima et al. ............ 134/1.3 |
| 5,886,675 A | 3/1999 | Aye et al. ............... 345/7 |
| 5,892,505 A | 4/1999 | Tropper ................ 345/208 |
| 5,895,233 A | 4/1999 | Higashi et al. ........... 438/107 |
| 5,898,515 A | 4/1999 | Furlani et al. ........... 359/290 |
| 5,903,243 A | 5/1999 | Jones .................. 345/7 |
| 5,903,395 A | 5/1999 | Rallison et al. .......... 359/630 |
| 5,904,737 A | 5/1999 | Preston et al. ........... 8/158 |
| 5,910,856 A | 6/1999 | Ghosh et al. ............ 359/291 |
| 5,912,094 A | 6/1999 | Aksyuk et al. ............ 430/5 |
| 5,912,608 A | 6/1999 | Asada ................. 335/222 |
| 5,914,801 A | 6/1999 | Dhuler et al. ............ 359/230 |
| 5,915,168 A | 6/1999 | Salatino et al. ........... 438/110 |
| 5,919,548 A | 7/1999 | Barron et al. ............ 428/138 |
| 5,920,411 A | 7/1999 | Duck et al. ............. 359/127 |
| 5,920,418 A | 7/1999 | Shiono et al. ............ 359/246 |
| 5,923,475 A | 7/1999 | Kurtz et al. ............. 359/619 |
| 5,926,309 A | 7/1999 | Little ................. 359/293 |
| 5,926,318 A | 7/1999 | Hebert ................ 359/618 |
| 5,942,791 A | 8/1999 | Shorrocks et al. ......... 257/522 |
| 5,949,390 A | 9/1999 | Nomura et al. ............ 345/32 |
| 5,949,570 A | 9/1999 | Shiono et al. ............ 359/291 |
| 5,953,161 A | 9/1999 | Troxell et al. ............ 359/618 |
| 5,955,771 A | 9/1999 | Kurtz et al. ............. 257/419 |
| 5,963,788 A | 10/1999 | Barron et al. ............ 438/48 |
| 5,978,127 A | 11/1999 | Berg .................. 359/279 |
| 5,982,553 A | 11/1999 | Bloom et al. ............ 359/627 |
| 5,986,634 A | 11/1999 | Alioshin et al. .......... 345/126 |
| 5,986,796 A | 11/1999 | Miles ................. 359/260 |
| 5,995,303 A | 11/1999 | Honguh et al. ........... 359/708 |
| 5,999,319 A | 12/1999 | Castracane ............. 359/573 |
| 6,004,912 A | 12/1999 | Gudeman ............... 508/577 |
| 6,012,336 A | 1/2000 | Eaton et al. |
| 6,016,222 A | 1/2000 | Setani et al. ............ 359/571 |
| 6,025,859 A | 2/2000 | Ide et al. .............. 347/135 |
| 6,038,057 A | 3/2000 | Brazas, Jr. et al. ....... 359/291 |
| 6,040,748 A | 3/2000 | Gueissaz ............... 335/78 |
| 6,046,840 A | 4/2000 | Huibers ............... 359/291 |
| 6,055,090 A | 4/2000 | Miles ................. 359/291 |
| 6,057,520 A | 5/2000 | Goodwin-Johansson .... 200/181 |
| 6,096,656 A | 8/2000 | Matzke et al. |
| 6,154,259 A | 11/2000 | Hargis et al. ........... 348/756 |
| 6,229,683 B1 | 5/2001 | Goodwin-Johansson .... 361/233 |
| 6,241,143 B1 | 6/2001 | Kuroda ................ 228/110.1 |
| 6,249,381 B1 | 6/2001 | Suganuma |
| 6,251,842 B1 | 6/2001 | Gudeman ............... 508/577 |
| 6,252,697 B1 | 6/2001 | Hawkins et al. .......... 359/290 |
| 6,254,792 B1 | 7/2001 | Van Buskirk et al. ....... 216/13 |
| 6,261,494 B1 | 7/2001 | Zavracky et al. ......... 264/104 |
| 6,268,952 B1 | 7/2001 | Godil et al. ............ 359/291 |
| 6,271,145 B1 | 8/2001 | Toda .................. 438/706 |
| 6,271,808 B1 | 8/2001 | Corbin ................ 345/7 |
| 6,274,469 B1 | 8/2001 | Yu .................... 438/592 |
| 6,282,213 B1 | 8/2001 | Gutin et al. |
| 6,286,231 B1 | 9/2001 | Bergman et al. ........... 34/410 |
| 6,290,859 B1 | 9/2001 | Fleming et al. ............ 216/2 |
| 6,290,864 B1 | 9/2001 | Patel et al. ............. 216/79 |
| 6,300,148 B1 | 10/2001 | Birdsley et al. .......... 438/15 |
| 6,303,986 B1 | 10/2001 | Shook ................. 257/680 |
| 6,310,018 B1 | 10/2001 | Behr et al. ............. 510/175 |
| 6,313,901 B1 | 11/2001 | Cacharelis |
| 6,323,984 B1 * | 11/2001 | Trisnadi ............... 359/245 |
| 6,327,071 B1 | 12/2001 | Kimura ............... 359/291 |
| 6,342,960 B1 | 1/2002 | McCullough ............ 359/124 |
| 6,346,430 B1 | 2/2002 | Raj et al. |
| 6,356,577 B1 | 3/2002 | Miller ................ 372/107 |
| 6,356,689 B1 | 3/2002 | Greywall .............. 385/52 |
| 6,359,333 B1 | 3/2002 | Wood et al. ............ 257/704 |
| 6,384,959 B1 | 5/2002 | Furlani et al. ........... 359/291 |
| 6,387,723 B1 | 5/2002 | Payne et al. ............. 438/48 |
| 6,392,309 B1 | 5/2002 | Wataya et al. ........... 257/796 |
| 6,396,789 B1 | 5/2002 | Guerra et al. ........... 369/112 |
| 6,418,152 B1 | 7/2002 | Davis |
| 6,421,179 B1 | 7/2002 | Gutin et al. ............ 359/572 |
| 6,445,502 B1 | 9/2002 | Islam et al. ............ 359/571 |
| 6,452,260 B1 | 9/2002 | Corbin et al. ........... 257/686 |
| 6,466,354 B1 | 10/2002 | Gudeman .............. 359/247 |
| 6,479,811 B1 | 11/2002 | Kruschwitz et al. |
| 6,480,634 B1 | 11/2002 | Corrigan ............... 385/4 |

| | | |
|---|---|---|
| 6,497,490 B1 | 12/2002 | Miller et al. .................. 359/614 |
| 6,525,863 B1 | 2/2003 | Riza ........................... 359/290 |
| 6,563,974 B2 | 5/2003 | Riza ........................... 385/18 |
| 6,565,222 B1 | 5/2003 | Ishii et al. ................... 359/883 |
| 6,569,717 B1 | 5/2003 | Murade |
| 2001/0019454 A1 | 9/2001 | Tadic-Galeb et al. ....... 359/649 |
| 2002/0015230 A1 | 2/2002 | Pilossof et al. ............. 359/558 |
| 2002/0021485 A1 | 2/2002 | Pilossof ...................... 359/295 |
| 2002/0079432 A1 | 6/2002 | Lee et al. .................... 250/216 |
| 2002/0105725 A1 | 8/2002 | Sweatt et al. ................ 359/566 |
| 2002/0112746 A1 | 8/2002 | DeYoung et al. ............. 134/36 |
| 2002/0131228 A1 | 9/2002 | Potter |
| 2002/0131230 A1 | 9/2002 | Potter ......................... 361/277 |
| 2002/0135708 A1 | 9/2002 | Murden et al. |
| 2002/0176151 A1 | 11/2002 | Moon et al. |
| 2002/0195418 A1 | 12/2002 | Kowarz et al. |
| 2002/0196492 A1 | 12/2002 | Trisnadi et al. |
| 2003/0056078 A1 | 3/2003 | Johansson et al. |

OTHER PUBLICATIONS

Wang, L. et al., "Speckle Reduction in Laser Projections With Ultrasonic Waves," pp. 1659–1664, Optical Engineering, vol. 39, No. 6, Jun. 2000.

Leith, E. N. et al., "Imagery With Pseudo–Randomly Diffused Coherent Illumination," pp. 2085–2089, Applied Optics, vol. 7, No. 10, Oct. 1968.

Goodman, J.W., "Statistical Properties of Laser Speckle Patterns," in Dainty, J.C. (editor), *Laser Speckle and Related Phenomena*, Topics in Applied Physics, vol. 9, Springer Verlag, New York, 1984.

Goodman, J.W. et al., "Speckle Reduction by a Moving Diffuser in Laser Projection Displays," Silicon Light Machines, Sunnyvale, California, Presented at OSA Anuual Meeting 2000, Oct. 23, 2000.

Hedayat, A.S. et al., *Orthogonal Arrays, Theory and Applications*, Springer–Verlag, Chapter 7, New York, 1999.

"Combining the Effects of a Moving Diffuser and Temporal Averaging," Sep. 3, 1998.

Goodman, J. W., "Some Fundamental Properties of Speckle," vol. 66, No. 11, pp. 1145–1149, Stanford University, Nov. 1976.

Wang, L. et al., "Speckle Reduction in Laser Projection Systems by Diffractive Optical Elements," pp. 1770–1775, Applied Optics vol. 37, No. 10, Apr. 1998.

P.C. Kundu et al., "Reduction of Speckle Noise by Varying the Polarisation of Illuminating Beam", XP–002183475, Depart. of Applied Physics, Dec. 30, 1975, pp. 63–67.

* cited by examiner $$\begin{pmatrix} 1 & 1 \\ 1 & -1 \end{pmatrix} \overset{44A}{\longleftarrow}$$

FIG. 5A $$\begin{pmatrix} 1 & -1 \\ 1 & 1 \end{pmatrix} \overset{45A}{\longleftarrow}$$

FIG. 5B $$\begin{pmatrix} 1 & 1 \\ -1 & 1 \end{pmatrix} \overset{46A}{\longleftarrow}$$

FIG. 5C $$\begin{pmatrix} -1 & 1 \\ 1 & 1 \end{pmatrix} \overset{47A}{\longleftarrow}$$

FIG. 5D $$\begin{array}{|c|c|} \hline A_{11} & A_{12} \\ \hline A_{21} & A_{22} \\ \hline \end{array} \quad \leftarrow 58$$

FIG. 6

$$\underset{58}{\begin{array}{|c|c|} \hline A_{11} & A_{12} \\ \hline A_{21} & A_{22} \\ \hline \end{array}} \times \underset{44}{\begin{array}{|c|c|} \hline 1 & 1 \\ \hline 1 & -1 \\ \hline \end{array}} = \begin{array}{|c|c|} \hline A_{11} & A_{12} \\ \hline A_{21} & -A_{22} \\ \hline \end{array}$$

FIG. 7A $$\underset{58}{\begin{array}{|c|c|} \hline A_{11} & A_{12} \\ \hline A_{21} & A_{22} \\ \hline \end{array}} \times \underset{45}{\begin{array}{|c|c|} \hline 1 & -1 \\ \hline 1 & 1 \\ \hline \end{array}} = \begin{array}{|c|c|} \hline A_{11} & -A_{12} \\ \hline A_{21} & A_{22} \\ \hline \end{array}$$

FIG. 7B 58
46

| $A_{11}$ | $A_{12}$ |
|---|---|
| $A_{21}$ | $A_{22}$ |

X

| 1 | 1 |
|---|---|
| -1 | 1 |

=

| $A_{11}$ | $A_{12}$ |
|---|---|
| $-A_{21}$ | $A_{22}$ |

FIG. 7C 58
47

| $A_{11}$ | $A_{12}$ |
|---|---|
| $A_{21}$ | $A_{22}$ |

X

| -1 | 1 |
|---|---|
| 1 | 1 |

=

| $-A_{11}$ | $A_{12}$ |
|---|---|
| $A_{21}$ | $A_{22}$ |

FIG. 7D $$H(1) = 1 \quad \overset{\text{\Large 82}}{\nwarrow}$$

$$H(2) = \begin{pmatrix} 1 & 1 \\ 1 & -1 \end{pmatrix} \overset{\text{\Large 84}}{\nwarrow}$$

$$H(4) = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \overset{\text{\Large 86}}{\nwarrow}$$

$$H(8) = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{pmatrix} \overset{\text{\Large 88}}{\nwarrow}$$

FIG. 9

|   i |   |    |    |    |
|-----|---|----|----|----|
| 1   | 1 | 1  | 1  | 1  |
| 2   | 1 | -1 | 1  | -1 |
| 3   | 1 | 1  | -1 | -1 |
| 4   | 1 | -1 | -1 | 1  |

| 1  | 2  | 3  | 4  | 5  | 6  | 7  | 8  | 9  | 10 | 11 | 12 | 13 | 14 | 15 | 16 |
|----|----|----|----|----|----|----|----|----|----|----|----|----|----|----|----|
| 2  | 1  | 4  | 3  | 6  | 5  | 8  | 7  | 10 | 9  | 12 | 11 | 14 | 13 | 16 | 15 |
| 3  | 4  | 1  | 2  | 7  | 8  | 5  | 6  | 11 | 12 | 9  | 10 | 15 | 16 | 13 | 14 |
| 4  | 3  | 2  | 1  | 8  | 7  | 6  | 5  | 12 | 11 | 10 | 9  | 16 | 15 | 14 | 13 |
| 5  | 6  | 7  | 8  | 1  | 2  | 3  | 4  | 13 | 14 | 15 | 16 | 9  | 10 | 11 | 12 |
| 6  | 5  | 8  | 7  | 2  | 1  | 4  | 3  | 14 | 13 | 16 | 15 | 10 | 9  | 12 | 11 |
| 7  | 8  | 5  | 6  | 3  | 4  | 1  | 2  | 15 | 16 | 13 | 14 | 11 | 12 | 9  | 10 |
| 8  | 7  | 6  | 5  | 4  | 3  | 2  | 1  | 16 | 15 | 14 | 13 | 12 | 11 | 10 | 9  |
| 9  | 10 | 11 | 12 | 13 | 14 | 15 | 16 | 1  | 2  | 3  | 4  | 5  | 6  | 7  | 8  |
| 10 | 9  | 12 | 11 | 14 | 13 | 16 | 15 | 2  | 1  | 4  | 3  | 6  | 5  | 8  | 7  |
| 11 | 12 | 9  | 10 | 15 | 16 | 13 | 14 | 3  | 4  | 1  | 2  | 7  | 8  | 5  | 6  |
| 12 | 11 | 10 | 9  | 16 | 15 | 14 | 13 | 4  | 3  | 2  | 1  | 8  | 7  | 6  | 5  |
| 13 | 14 | 15 | 16 | 9  | 10 | 11 | 12 | 5  | 6  | 7  | 8  | 1  | 2  | 3  | 4  |
| 14 | 13 | 16 | 15 | 10 | 9  | 12 | 11 | 6  | 5  | 8  | 7  | 2  | 1  | 4  | 3  |
| 15 | 16 | 13 | 14 | 11 | 12 | 9  | 10 | 7  | 8  | 5  | 6  | 3  | 4  | 1  | 2  |
| 16 | 15 | 14 | 13 | 12 | 11 | 10 | 9  | 8  | 7  | 6  | 5  | 4  | 3  | 2  | 1  |

FIG. 11

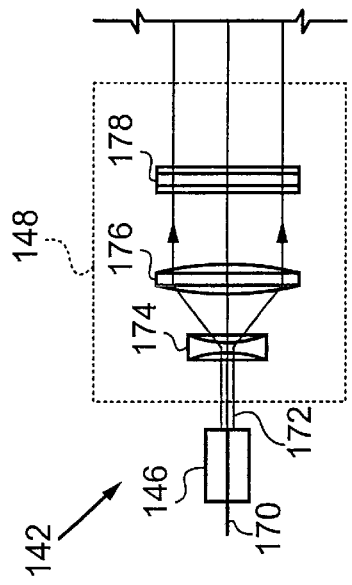
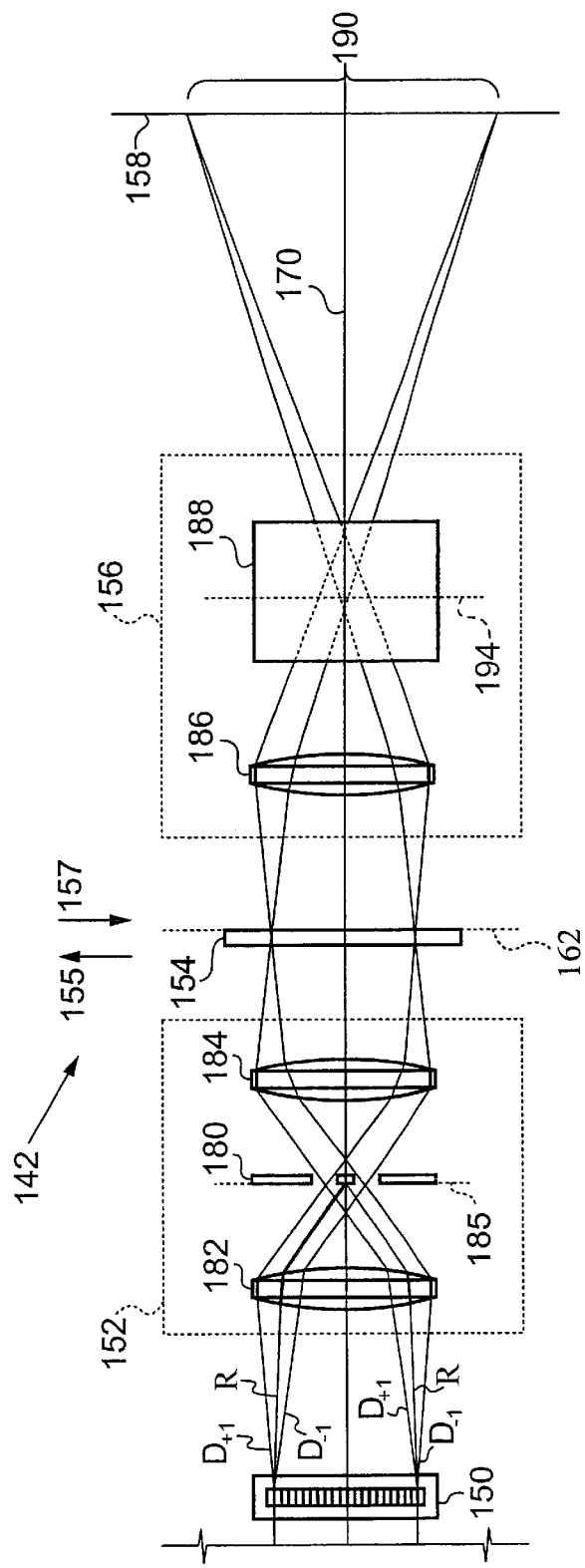

METHOD, APPARATUS, AND DIFFUSER FOR REDUCING LASER SPECKLE

RELATED APPLICATIONS

This application claims priority under 35 U.S.C. §119(e) of the U.S. provisional application Serial No. 60/301,053 filed on Jun. 25, 2001 and entitled "Hadamard Phase Patterns for Optimum Laser Speckle Reduction." The provisional application Serial No. 60/301,053 filed on Jun. 25, 2001 and entitled "Hadamard Phase Patterns for Optimum Laser Speckle Reduction" is also hereby incorporated by reference.

FIELD OF THE INVENTION

This invention relates to the field of laser illumination. More particularly, this invention relates to the field of laser illumination where an intensity detector observes a surface illuminated by the laser illumination and where it is desirable to reduce speckle observed by the intensity detector.

BACKGROUND OF THE INVENTION

A human eye has finite resolution. When the eye views an object, the eye quantizes the object into resolution spots, each of which are point spread functions of the eye. For example, if a person stands about 3 meters from a surface, the eye resolves the surface into the resolution spots with each of the resolution spots having a diameter of about 1 mm.

FIG. 1 illustrates the eye 12 viewing a diffuse surface 14. A laser illumination 16 illuminates the diffuse surface 14. A particular resolution spot 18 is imaged onto a retina of the eye 12. Features of the diffuse surface 14 that are within the resolution spot 18 are not resolvable by the eye 12. The diffuse surface includes many scattering centers within the resolution spot 18. The scattering centers scatter the laser illumination 16 which is illuminating the resolution spot 18. Because the laser illumination 16 is coherent, the scattering centers create interference within the eye 12. The interference causes the eye 12 to perceive the resolution spot on a brightness scale ranging from a bright spot to a dark spot.

Each scattering center forms a source of lightwaves. The lightwaves constructively interfere; or the lightwaves partially constructively interfere and partially destructively interfere; or the lightwaves destructively interfere. If the lightwaves constructively interfere, the resolution spot 18 is the bright spot. If the lightwaves partially constructively interfere and partially destructively interfere, the resolution spot 18 has an intermediate brightness forming an intermediate brightness spot. If the lightwaves destructively interfere, the resolution spot 18 is the dark spot.

Thus, the eye 12 images the diffuse surface 14 into surface resolution spots in a random pattern of bright spots, intermediate brightness spots, and dark spots. This is speckle. More generally, an optical system which employs an intensity detector will also detect the speckle. One skilled in the art will recognize that the eye 12 is a biological optical system in which the retina functions as the intensity detector. A camera employs a type of intensity detector, which is film for a conventional camera or, typically, a charge coupled device for a digital camera. Thus, a photo of the diffuse surface 14 will show the speckle. FIG. 2 is a photo of speckle 19 which shows a granular pattern of the bright spots, the intermediate brightness spots, and the dark spots.

A measure of the speckle is contrast (C). The contrast, in percent, is given by $C=100*I_{RMS}/\bar{I}$ where $\bar{I}$ is a mean intensity and $I_{RMS}$ is a root mean square intensity fluctuation about the mean intensity.

Goodman in "Some fundamental properties of speckle," J. Opt. Soc. A., Vol. 66, No. 11, November 1976, pp 1145–1150, teaches that the speckle can be reduced by superimposing N uncorrelated speckle patterns. This reduces the contrast by a speckle reduction factor of $\sqrt{N}$ provided that the N uncorrelated speckle patterns have equal mean intensities and contrasts. If the N uncorrelated speckle patterns have non-equal mean intensities or non-equal contrasts, the speckle reduction factor will be less than $\sqrt{N}$. Thus, the speckle reduction factor of $\sqrt{N}$ is a best case for the speckle reduction for the N uncorrelated speckle patterns. Goodman further teaches that the uncorrelated speckle patterns can be obtained by means of time, space, frequency, or polarization.

A speckle reduction method of the prior art creates multiple speckle patterns by moving a viewing screen in an oscillatory motion, which employs the time means taught by Goodman. The oscillatory motion typically follows a small circle or a small ellipse about the optic axis. This causes the speckle pattern to shift relative to the eye 12 viewing the viewing screen and, thus, forms multiple speckle patterns over time. Though the amount of the speckle at any instant in time is unchanged, the eye 12 perceives the reduced speckle provided that the speed of the oscillatory motion is above a threshold speed. Stated another way, the eye 12 detects reduced speckle if an integration time for the eye 12 is sufficiently long that the oscillatory motion produces the uncorrelated speckle patterns within the integration time.

In the art of laser illuminated display systems, it is known that an active diffuser can be added to a laser illuminated imaging system to reduce laser speckle. The active diffuser is placed in an intermediary image plane or near the intermediary image plane. The active diffuser is moved in the intermediate image plane in a rotation or toroidal pattern about a display system optic axis in order to create a shifting phase at a display screen. The shifting phase creates uncorrelated speckle patterns over time, thus employing the time means, taught by Goodman.

Wang et al. in "Speckle reduction in laser projection systems by diffractive optical elements," Applied Optics, Vol. 37, No. 10, April 1998, pp 1770–1775, teach a method of laser speckle reduction in a laser projection system such as a laser television system. In the laser projection system a laser spot forms an image on a display screen by a raster scan similarly to how an electron beam forms an image in a CRT (cathode ray tube) display. The method taught by Wang et al. is accomplished by expanding a laser beam, placing a diffractive optical element in the expanded laser beam to form multiple beamlets, and then focusing the laser beamlets to form the laser spot on the display screen. The multiple beamlets shift slightly as each pixel is formed on the display screen. This provides a time varying speckle pattern and consequently a speckle reduction. Wang et al. further teach that the diffractive optical element can be rotated to slightly improve the speckle reduction.

Bloom et al. in U.S. Pat. No. 5,982,553 issued on Nov. 9, 1999, incorporated herein by reference, teach a display system including a grating light valve, red, green, and blue lasers, various lens arrangements, a scanning mirror, a display screen, and electronics. The electronics control the grating light valve, the lasers, and the scanning mirror to form a two dimensional image on the display screen.

In the display system taught by Bloom et al., the grating light valve forms a line image composed of a linear array of pixels on the display screen. The scanning mirror repeatedly scans the line image across the display screen in a direction perpendicular to the line image as the grating light valve modulates the linear array of pixels thereby forming the two dimensional image.

Because the two dimensional image taught by Bloom et al. is formed by laser illumination, the two dimensional image exhibits laser speckle, which degrades an image quality. It would be desirable to improve the image quality by reducing the laser speckle.

What is needed is a method of reducing laser speckle in a laser illuminated display system where a two dimensional image is formed on a display screen.

What is needed is a method of reducing laser speckle in an optical system where a laser illumination illuminates a diffuse surface.

SUMMARY OF THE INVENTION

The present invention is a method of reducing speckle, an apparatus for reducing speckle, a display apparatus featuring reduced speckle, and a diffuser for reducing speckle. The method of the present invention includes dividing a laser illuminated area into phase cells, subdividing the phase cells into a number of cell partitions, and applying a temporal phase variation to the cell partitions within an integration time of an intensity detector viewing the laser illuminated area. If the temporal phase variation is optimally applied, the intensity detector detects an optimum speckle reduction which corresponds to a square root of the number of cell partitions.

In order for the intensity detector to detect the optimum speckle reduction, the intensity detector must resolve the laser illuminated area into resolution spots having a resolution spot size which is greater than or proximately equal to a phase cell size. In other words, in order for the intensity detector to detect the optimum speckle reduction, the intensity detector must be no closer than a distance where the intensity detector resolves the resolution spots into the resolution spot size corresponding to the phase cell size. If the intensity detector is closer than the distance where the intensity detector resolves the resolution spots with the resolution spot size smaller than the phase cell size, the intensity detector will detect a speckle reduction but not the optimum speckle reduction.

The apparatus for reducing speckle includes illumination optics, a diffuser, and projection optics. The illumination optics couple a laser illumination to the diffuser, which is located in a first image plane. The diffuser divides the laser illumination into the phase cells and subdivides the phase cells into the cell partitions. The diffuser also applies the temporal phase variation to the cell partitions. The projection optics project an image of the first image plane onto a diffuse surface and, thus, image the phase cells and the cell partitions onto the diffuse surface. Provided that the temporal phase variation is applied within the integration time of the intensity detector viewing the diffuse surface, the intensity detector detects reduced speckle.

The display apparatus of the present invention incorporates the apparatus for reducing speckle. The display apparatus produces a laser illumination display image comprising pixels at the diffuser and the projection optics project the laser illumination display image onto a display screen. The diffuser divides the pixels into sub-pixels and applies the temporal phase variation to the sub-pixels, which reduces speckle in the laser illumination display image on the display screen.

The diffuser of the present invention includes first and second diffuser cells. Each of the first and second diffuser cell includes first and second diffuser cell partitions. In use, the first diffuser cell partitions induce a first relative phase of zero while the second diffuser cell partitions induce a second relative phase of pi radians. The first and second diffuser cell partitions of the first diffuser cells are preferably arranged in a first Hadamard matrix pattern. The first and second diffuser cell partitions of the second diffuser cell are preferably arranged in a second Hadamard matrix pattern. The first and second Hadamard matrix patterns correspond to first and second Hadamard matrices which satisfy a decorrelation condition.

BRIEF DESCRIPTION OF THE DRAWINGS

FIGS. 5A through 5D shows first through fourth Hadamard matrices of the present invention in mathematical representation.

FIG. 6 schematically illustrates an amplitude distribution of a phase cell divided into first through fourth cell partitions of the present invention.

FIGS. 7A through 7D schematically illustrates application of the first through fourth Hadamard matrices to the amplitude distribution of the phase cell of the present invention.

FIG. 9 shows first, second, fourth, and eighth order Sylvester representation Hadamard matrices of the present invention in mathematical representation.

FIG. 10 shows the fourth order Sylvester representation Hadamard representation of the present invention in mathematical representation with rows enumerated by row index.

FIG. 11 shows a sixteenth order row permutation lookup table of the present invention.

FIG. 16 illustrates an elevation view of the display optics employing the preferred diffuser of the present invention.

DETAILED DESCRIPTION OF THE PREFERRED EMBODIMENT

The preferred embodiment of the present invention is a display system employing the preferred diffuser of the present invention. In order to explain basic concepts of the present invention, a first alternative embodiment of the present invention is described before describing the display apparatus and the preferred diffuser.

Figure 1:
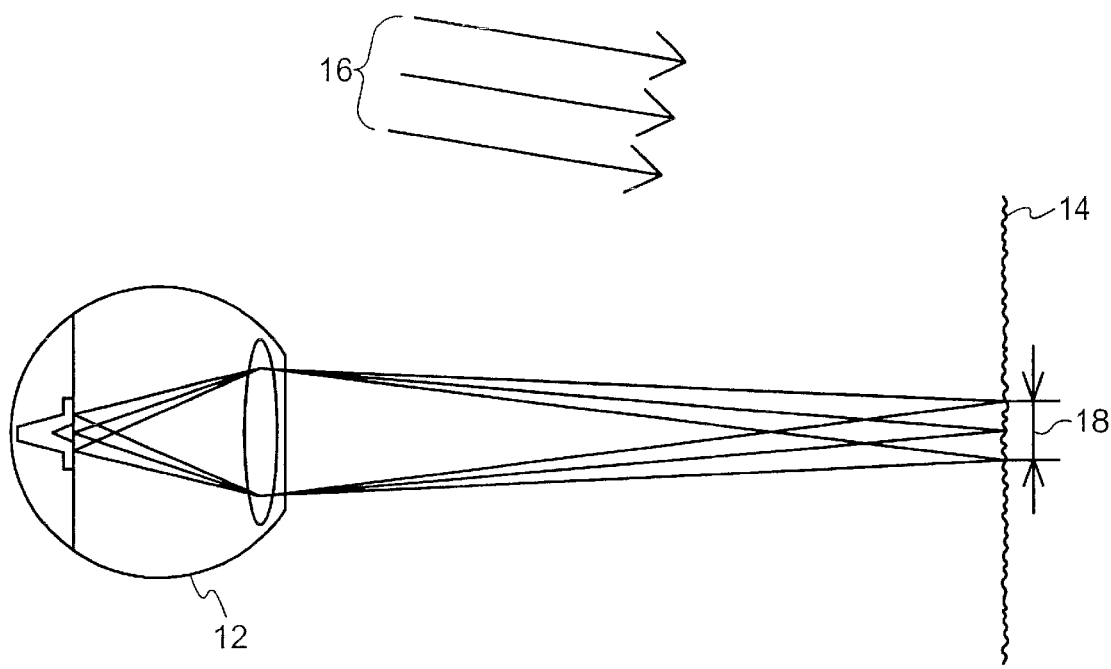
FIG. 1 illustrates a laser illumination illuminating a surface and a human eye observing the surface.
Figure 2:
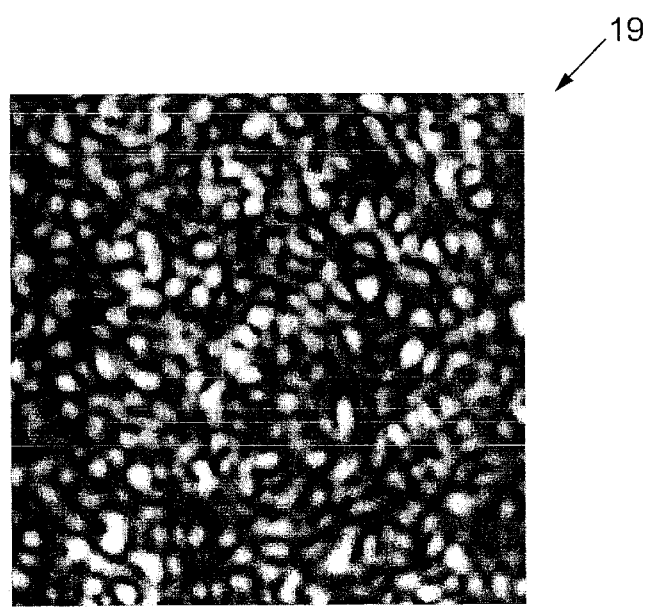
FIG. 2 is a photo of speckle.
Figure 3:
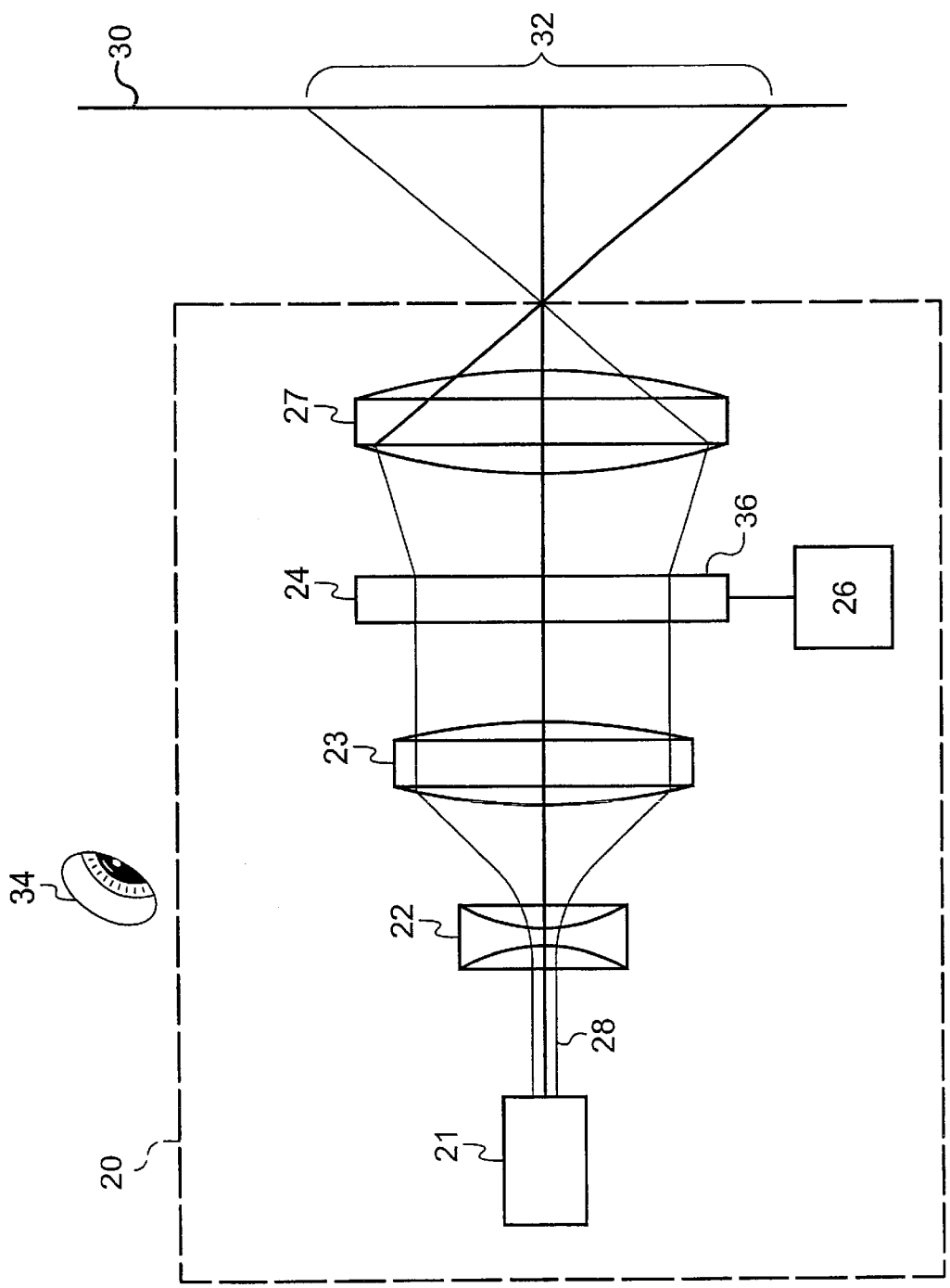
FIG. 3 illustrates a first alternative embodiment of the present invention.

The first alternative embodiment of the present invention is illustrated in FIG. 3. The first alternative embodiment 20 includes a laser source 21, a divergent lens 22, a collimation lens 23, a first alternative diffuser 24, first electronics 26, and a projection lens 27. The first electronics 26 are electrically coupled to the first alternative diffuser 24. Preferably, the laser source 21 is optically coupled to the first alternative diffuser 24 via the divergent lens 22 and the collimation lens 23. The laser source 22 emits a laser illumination 28, which is expanded by the divergent lens 22, collimated by the collimation lens 23, imaged at the first alternative diffuser 24, and projected onto a diffuse surface 30 to produce a laser illuminated area 32. Thus, there is a first image plane at the first alternative diffuser 24 and a second image plane at the diffuse surface 30. The laser illuminated area 32 is preferably viewed by a human eye 34. Alternatively and more generally, the laser illuminated area 32 is viewed by an optical system having an intensity detector.

A phase producing surface of the first alternative diffuser 24 divides the laser illuminated area 32 into phase cells and subdivides the phase cells into a number of cell partitions. The first electronics 26 drive the first alternative diffuser 24 applying a temporal phase variation to the cell partitions within an integration time of the eye 34. The temporal phase variation reduces speckle detected by the eye 34. The eye 34 resolves the laser illuminated area 32 into resolution spots. Preferably, a phase cell size is no larger than about a resolution spot size. Alternately, the phase cell size is larger than the resolution spot size but this leads to less effective speckle reduction.

The temporal phase variation preferably comprises time steps where a number of time steps corresponds to the number of cell partitions of each phase cell. Thus, if there are four cell partitions in each phase cell, the temporal phase variation preferably takes place over four time steps. Alternatively, the number of time steps is less than the number of cell partitions but this leads to less effective speckle reduction. Preferably, the time steps are of about equal duration. Alternatively, the time steps are not of equal duration but this also leads to less effective speckle reduction.

Preferably, the number of cell partitions of each phase cell comprises first and second cell partitions, which preferably have a relative phase of zero and pi ($\pi$) radians, respectively. For a first time step, the first and second cell partitions for a particular phase cell comprise a first phase cell pattern. At an end of the first time step, the first and second cell partitions for the particular phase cell are partially rearranged to produce a second phase cell pattern which satisfies a decorrelation condition. For a second time step, the first and second cell partitions comprise the second phase cell pattern.

This continues for subsequent time steps. For the subsequent time steps, the first and second cell partitions for the particular phase cell comprise subsequent phase cell patterns. Between the subsequent time steps, the first and second cell partitions for the particular phase cell are partially rearranged to produce a next phase cell pattern which satisfies the decorrelation condition. Eventually, the first and second cell partitions are rearranged to the first phase cell pattern and the temporal phase variation proceeds through the first, second, and subsequent time steps again.

The temporal phase variation of the cell partitions of the particular phase cell accomplishes a spatial phase variation within the particular phase cell by rearranging the cell partitions between the time steps. In other words, the temporal phase variation comprises arranging the first and second cell partitions in a number of phase cell patterns corresponding to the number of time steps. Further, each of the phase cell patterns produce a speckle pattern which is uncorrelated from speckle patterns produced by remaining phase cell patterns. This produces a number of uncorrelated speckle patterns corresponding to the number of phase cell patterns. Consequently, for the time steps of about equal duration, the number of phase cell patterns reduce speckle by a speckle reduction factor of a square root of the number of phase cell patterns.

When the number of time steps correspond to the number of cell partitions, the number of phase cell patterns also correspond to the number of cell partitions. In this situation, the number of phase cell patterns is referred to as an optimum decorrelation set. Also in this situation, the number of uncorrelated speckle patterns produce an optimum speckle reduction. This is because, for the particular phase cell divided into the number of cell partitions, it only takes the number of time steps corresponding to the number of cell partitions to reduce the speckle by a square root of the number of time steps. Thus, the optimum speckle reduction is reached in a minimum number of time steps and it is optimum because it is reached in the minimum number of time steps.

Figure 4A:
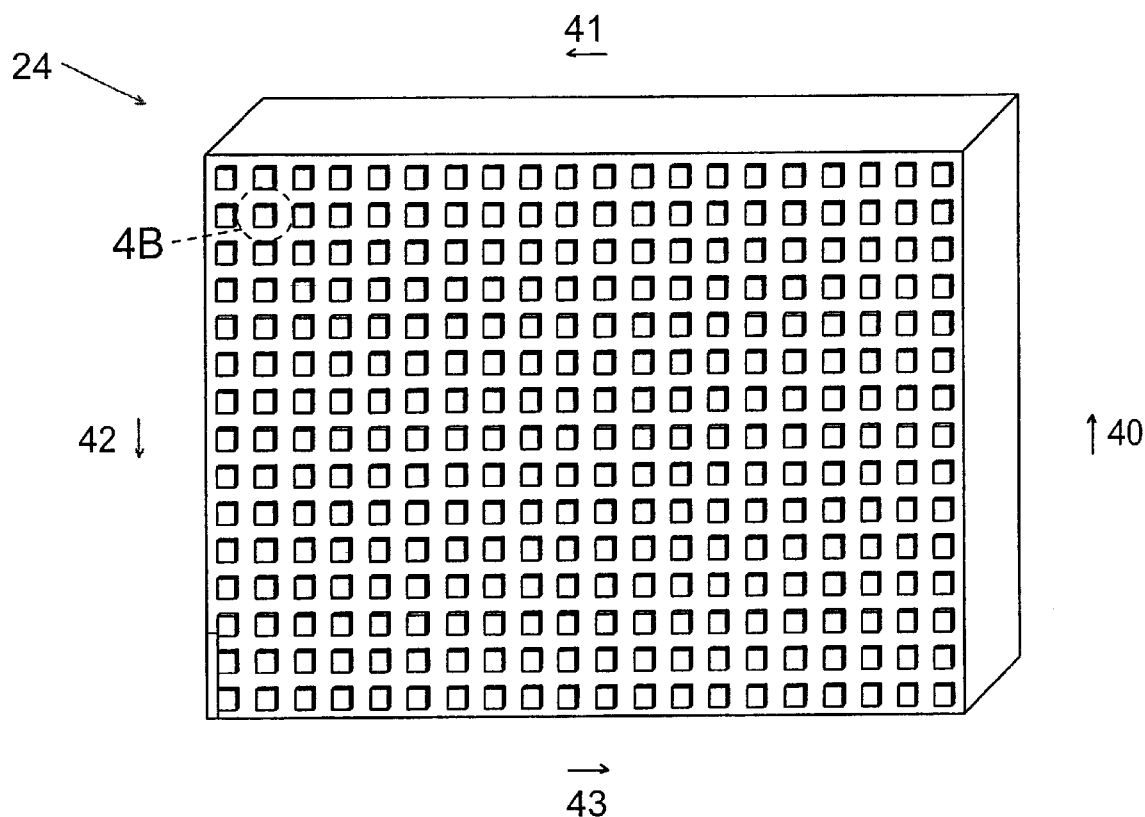
FIGS. 4A and 4B illustrate a first alternative diffuser of the present invention.

The first alternative diffuser 24 of the present invention is illustrated in FIG. 4A. The first alternative diffuser 24 is preferably comprised of an optically transparent material which, in combination with the phase producing surface 36 and a diffuser motion, produces the temporal phase variation. Alternatively, the first alternative diffuser 24 is replaced with a second alternative diffuser of the present invention comprising a reflective material which, in combination with an alternative phase producing surface and the diffuser motion, produces the temporal phase variation. Further alternatively, the first alternative diffuser 24 is replaced with a third alternative diffuser of the present invention comprising an electro-optic device, such as a liquid crystal modulator, which electro-optically produces the temporal phase variation.

Preferably, the diffuser motion for the first alternative diffuser 24 comprises first through fourth motions, 40–43, applied sequentially to produce a total exposure time. Preferably, the first through fourth motions, 40–43, are applied as steps with each step occurring after an exposure time. Alternatively, the first through fourth motions, 40–43, are applied as continuous motions with each continuous motion taking place over the exposure time. Preferably, the total exposure time is approximately a typical integration time for the eye 34 (approximately 50 msec). Alternatively, the typical integration time is an integral multiple of the total exposure time. Further alternatively, the total exposure time is merely less than the typical integration time.

Figure 4B:
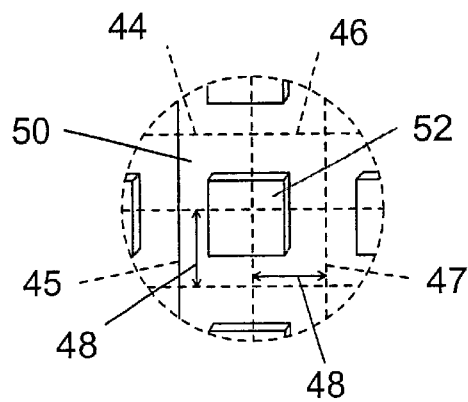

A portion of the first alternative diffuser 24 is illustrated in FIG. 4B. The portion of the first alternative diffuser 24 comprises first through fourth diffuser phase cells, 44–47, which correspond to first through fourth phase cells of the laser illuminated area 32. The first through fourth diffuser phase cells, 44–47, are replicated to produce the first phase producing surface 36. Each of the first through fourth diffuser phase cells, 44–47, preferably comprise a square area of the phase producing surface 36 having a diffuser phase cell width 48. Preferably, a motion distance of the first through fourth motions, 40–43, corresponds to the diffuser phase cell width 48.

Preferably, the first phase producing surface 36 comprises a two-dimensional array of the first through fourth diffuser phase cells, 44–47. Each of the first through fourth diffuser phase cells, 44–47, preferably comprises a first planar surface 50 and a second planar surface 52. A height difference h between the first and second planar surfaces comprises an optical path difference which produces the relative phase of pi ($\pi$) radians. The height difference is given by: $h=\lambda/[2(n-1)]$, where $\lambda$ is a light wavelength and n is an index of refraction for the optically transparent material of the first alternative diffuser 24.

The first through fourth diffuser phase cells, 44–47, comprise first through fourth diffuser cell partitions. The first through fourth diffuser cell partitions are mathematically described by first through fourth Hadamard matrices. The first through fourth Hadamard matrices of the present invention are shown mathematically in FIGS. 5A–5D, respectively. The first through fourth Hadamard matrices, 44A–47A, are second order Hadamard matrices, which comprise a second order optimum decorrelation set of the present invention.

An nth order Hadamard matrix ($H_n$), named for Jacques-Salomon Hadamard (1865–1963) who discovered Hadamard matrices, is a square matrix of matrix elements one (1) and minus one (–1) that when multiplied by a Hadamard matrix transpose ($H_n^T$) gives n times an nth order identity matrix ($I_n$):

$$H_n H_n^T = n(I_n)$$

The Hadamard matrices exist for the nth order of one, four, and multiples of four. The nth order Hadamard matrix ($H_n$) has $n^2$ matrix elements. For example, a Hadamard matrix of order two has four matrix elements.

Each of the first through fourth Hadamard matrices, 44A–47A, comprises a second order matrix having first through fourth matrix elements. The first Hadamard matrix 44A has the first through the third matrix elements $H_{11}$, $H_{12}$, and $H_{21}$, equal to one, and the fourth matrix element $H_{22}$ equal to minus one. Preferably, the first through the third matrix elements, $H_{11}$, $H_{12}$, and $H_{21}$, of the first Hadamard matrix 44A correspond to a zero phase shift while the fourth matrix element $H_{22}$ corresponds to a pi ($\pi$) radians phase shift. Alternatively, the first through third matrix elements, $H_{11}$, $H_{12}$, and $H_{21}$, correspond to the pi ($\pi$) radians phase shift while the -fourth matrix element $H_{22}$ corresponds to the zero phase shift.

The second Hadamard matrix 45A is formed by swapping first and second rows of the first Hadamard matrix 44A. The third Hadamard matrix 46A is formed by swapping first and second columns of the first Hadamard matrix 44A. The fourth Hadamard matrix 47A is formed by swapping the first and second columns of the second Hadamard matrix 45A.

An amplitude distribution of a particular phase cell divided into four cell partitions of the present invention is schematically illustrated in FIG. 6. The amplitude distribution 58 detected by the eye 34 (not shown) comprises first through fourth amplitudes, $A_{11}$, $A_{12}$, $A_{21}$, $A_{22}$. Since the eye 34 is a type of intensity detector, the eye 34 does not detect the first through fourth amplitudes, $A_{11}$, $A_{12}$, $A_{21}$, $A_{22}$. Rather, the eye 34 detects an original intensity ($S_0$) which is given by a first square of a first sum of the amplitudes, $A_{11}$, $A_{12}$, $A_{21}$, $A_{22}$:

$$\begin{aligned} S_0 &= |A_{11} + A_{12} + A_{21} + A_{22}|^2 \\ &= |A_{11}|^2 + |A_{12}|^2 + |A_{21}|^2 + |A_{22}|^2 + \\ &\quad 2A_{11}A_{12} + 2A_{11}A_{21} + 2A_{11}A_{22} + \\ &\quad 2A_{12}A_{21} + 2A_{12}A_{22} + 2A_{21}A_{22} \end{aligned}$$

Terms $2A_{11}A_{12}$, $2A_{11}A_{21}$, $2A_{11}A_{22}$, $2A_{12}A_{21}$, $2A_{12}A_{22}$, and $2A_{21}A_{22}$ are cross terms. Depending on the first through fourth amplitudes, $A_{11}$, $A_{12}$, $A_{21}$, $A_{22}$, and depending on phases of the first through fourth amplitudes, $A_{11}$, $A_{12}$, $A_{21}$, $A_{22}$, the cross terms could cause the particular phase cell to be a dark spot, an intermediate brightness spot, or a bright spot causing the eye 34 to detect the speckle.

It will be readily apparent to one skilled in the art that the first through fourth amplitudes, $A_{11}$, $A_{12}$, $A_{21}$, $A_{22}$, are more accurately depicted as combinations of amplitude and phase, $|A_{11}|e^{i\Phi_{11}}$, $|A_{12}|e^{i\Phi_{12}}$, $|A_{21}|e^{i\Phi_{21}}$, $|A_{22}|e^{i\Phi_{22}}$, respectively. Further, it will be readily apparent to one skilled in the art that cross terms of the original intensity $S_0$ are more accurately written in complex mathematics terms so that, for example, $2A_{11}A_{12}$ is more accurate depicted as $A^*_{11}A_{12}+A_{11}A^*_{12}$. Moreover, it will be readily apparent to one skilled in the art that neglecting complex mathematics terms merely simplifies this discussion without degrading validity of this discussion.

Application of the first Hadamard matrix 44A to the first through fourth amplitudes, $A_{11}$, $A_{12}$, $A_{21}$, $A_{22}$, of the present invention is schematically illustrated in FIG. 7A. Application of the first Hadamard matrix 44A to the first through fourth amplitudes, $A_{11}$, $A_{12}$, $A_{21}$, $A_{22}$, maintains the phase of the first through third amplitudes, $A_{11}$, $A_{12}$, $A_{21}$, while shifting the phase of the fourth amplitude $A_{22}$ by pi ($\pi$) radians thus transforming the fourth amplitude $A_{22}$ to a minus fourth amplitude $-A_{22}$. The eye 34 now detects a first intensity ($S_1$) as follows:

$$\begin{aligned} S_1 &= |A_{11} + A_{12} + A_{21} - A_{22}|^2 \\ &= |A_{11}|^2 + |A_{12}|^2 + |A_{21}|^2 + |A_{22}|^2 + \\ &\quad 2A_{11}A_{12} + 2A_{11}A_{21} - 2A_{11}A_{22} + \\ &\quad 2A_{12}A_{21} - 2A_{12}A_{22} - 2A_{21}A_{22} \end{aligned}$$

Application of the second Hadamard matrix 45A to the first through fourth amplitudes, $A_{11}$, $A_{12}$, $A_{21}$, $A_{22}$, of the present invention is schematically illustrated in FIG. 7B. Application of the second Hadamard matrix 45A to the first through fourth amplitudes, $A_{11}$, $A_{12}$, $A_{21}$, $A_{22}$, maintains the phase of the first, third, and fourth amplitudes, $A_{11}$, $A_{21}$, and $A_{22}$, while shifting the phase of the second amplitude $A_{12}$ by pi ($\pi$) radians thus transforming the second amplitude $A_{12}$ to a minus second amplitude $-A_{12}$. The eye 34 now detects a second intensity ($S_2$) as follows:

$$S_2 = |A_{11} - A_{12} + A_{21} + A_{22}|^2$$
$$= |A_{11}|^2 + |A_{12}|^2 + |A_{21}|^2 + |A_{22}|^2 -$$
$$2A_{11}A_{12} + 2A_{11}A_{21} + 2A_{11}A_{22} -$$
$$2A_{12}A_{21} - 2A_{12}A_{22} + 2A_{21}A_{22}$$

Application of the third Hadamard matrix 46A to the first through fourth amplitudes, $A_{11}, A_{12}, A_{21}, A_{22}$, of the present invention is schematically illustrated in FIG. 7C. Application of the third Hadamard matrix 46A to the first through fourth amplitudes, $A_{11}, A_{12}, A_{21}, A_{22}$, maintains the phase of the first, second, and fourth amplitudes, $A_{11}, A_{12}, A_{22}$, while shifting the phase of the third amplitude $A_{21}$ by pi ($\pi$) radians thus transforming the third amplitude $A_{21}$ to a minus third amplitude $-A_{21}$. The eye 34 now detects a third intensity ($S_3$) as follows:

$$S_3 = |A_{11} + A_{12} - A_{21} + A_{22}|^2$$
$$= |A_{11}|^2 + |A_{12}|^2 + |A_{21}|^2 + |A_{22}|^2 +$$
$$2A_{11}A_{12} + 2A_{11}A_{21} + 2A_{11}A_{22} -$$
$$2A_{12}A_{21} + 2A_{12}A_{22} - 2A_{21}A_{22}$$

Application of the fourth Hadamard matrix 47A to the first through fourth amplitudes, $A_{11}, A_{12}, A_{21}, A_{22}$, of the present invention is schematically illustrated in FIG. 7D. Application of the fourth Hadamard matrix 47A to the first through fourth amplitudes, $A_{11}, A_{12}, A_{21}, A_{22}$, maintains the phase of the second through fourth amplitudes, $A_{12}, A_{21}, A_{22}$, while shifting the phase of the first amplitude $A_{11}$ by pi ($\pi$) radians thus transforming the first amplitude $A_{11}$ to a minus first amplitude $-A_{11}$. The eye 34 now detects a fourth intensity ($S_4$) as follows:

$$S_4 = |-A_{11} + A_{12} + A_{21} + A_{22}|^2$$
$$= |A_{11}|^2 + |A_{12}|^2 + |A_{21}|^2 + |A_{22}|^2 -$$
$$2A_{11}A_{12} - 2A_{11}A_{21} - 2A_{11}A_{22} +$$
$$2A_{12}A_{21} + 2A_{12}A_{22} + 2A_{21}A_{22}$$

By applying the second order optimum decorrelation set of the first through fourth Hadamard matrices, 44A–47A, to the amplitude distribution 58 for an approximately equal duration within the integration time of the eye 34, the eye 34 averages the first through fourth intensities, $S_1$–$S_4$, to produce a phase varied intensity $S_5$ as follows:

$$S_5 = 1/4(S_1 + S_2 + S_3 + S_4)$$
$$= |A_{11}|^2 + |A_{12}|^2 + |A_{21}|^2 + |A_{22}|^2$$

By applying the first through fourth Hadamard matrices, 44A–47A, to the amplitude distribution 58 of the phase cell within the integration time of the eye 34, the unvaried intensity $S_0$ of the first square of the first sum of the first through fourth amplitudes, $A_{11}, A_{12}, A_{21}, A_{22}$, becomes the phase varied intensity $S_5$ of a second sum of second squares of the first through fourth amplitudes, $A_{11}, A_{12}, A_{21}, A_{22}$. A comparison of the original intensity $S_0$ and the phase varied intensity $S_5$ shows that the first through fourth Hadamard matrices eliminate the cross terms of $2A_{11}A_{12}$, $2A_{11}A_{21}$, $2A_{11}A_{22}$, $2A_{12}A_{21}$, $2A_{12}A_{22}$, and $2A_{21}A_{22}$ from the original intensity $S_0$. The cross terms tend to produce either a bright spot or a dark spot. Thus, eliminating the cross terms tends to produce more intermediate brightness spots, which provides the speckle reduction.

Each of the first through fourth Hadamard matrices, 44A–47A, makes a contribution toward the elimination of the cross terms between the original intensity $S_0$ and the phase varied intensity $S_5$. Thus, for the particular phase cell divided into the four cell partitions, the decorrelation condition becomes the partial rearrangement of relative phases for the first through fourth amplitudes, $A_{11}, A_{12}, A_{21}, A_{22}$, which provides the reduction in the cross terms without a reduction in the squares.

A more general formulation of the decorrelation follows: First consider a general phase cell divided into an integer number of cell partitions. Next, consider first and second phase cell patterns of the integer number of cell partitions where relative phases of the amplitudes of the first phase cell pattern are partially rearranged to form the second phase cell pattern. Then, the first and second phase cell patterns fulfill the decorrelation condition if each of the first and second phase cell patterns provides the reduction of the cross terms of a resulting intensity without a reduction of intensity provided by each cell partition alone.

Preferably, a time period for application of the first through fourth Hadamard matrices, 44A–47A, is the integration time. Alternatively, the first through fourth Hadamard matrices, 44A–47A, are applied in the time period such that the integration time is an integral multiple of the time period. For both the time period equal to the integration time and the integration time period equal to the integral multiple of the time period, the cross terms are theoretically cancelled. This produces a theoretical optimum speckle reduction for the first through fourth Hadamard matrices, 44A–47A, of $\sqrt{}4=2$ since the first through fourth Hadamard matrices, 44A–47A, produce four uncorrelated speckle patterns.

Further alternatively, but with slightly less effectiveness, the time period is not maintained such that the integration time is an integral multiple of the time period. If the time period is not maintained such that the integration time is an integral multiple of the time period and the time period is on the order of the integration time, the cross terms will only partially cancel.

Therefore, the first alternative diffuser 24 of the first alternative embodiment 20 (FIG. 3) tends to reduce the speckle detected by the eye 34 from the first square of the first sum of the first through fourth amplitudes, $A_{11}, A_{12}, A_{21}, A_{22}$, to the second sum of the second squares of the first through fourth amplitudes, $A_{11}, A_{12}, A_{21}, A_{22}$.

It will be readily apparent to one skilled in the art that the speckle will be further reduced by applying, within the integration time of the eye 34, an nth order decorrelation set of nth order Hadamard matrices to produce a second optimum speckle reduction of n, where the n is an element of the set comprising {4, 8, 12, ... }.

Figure 8:
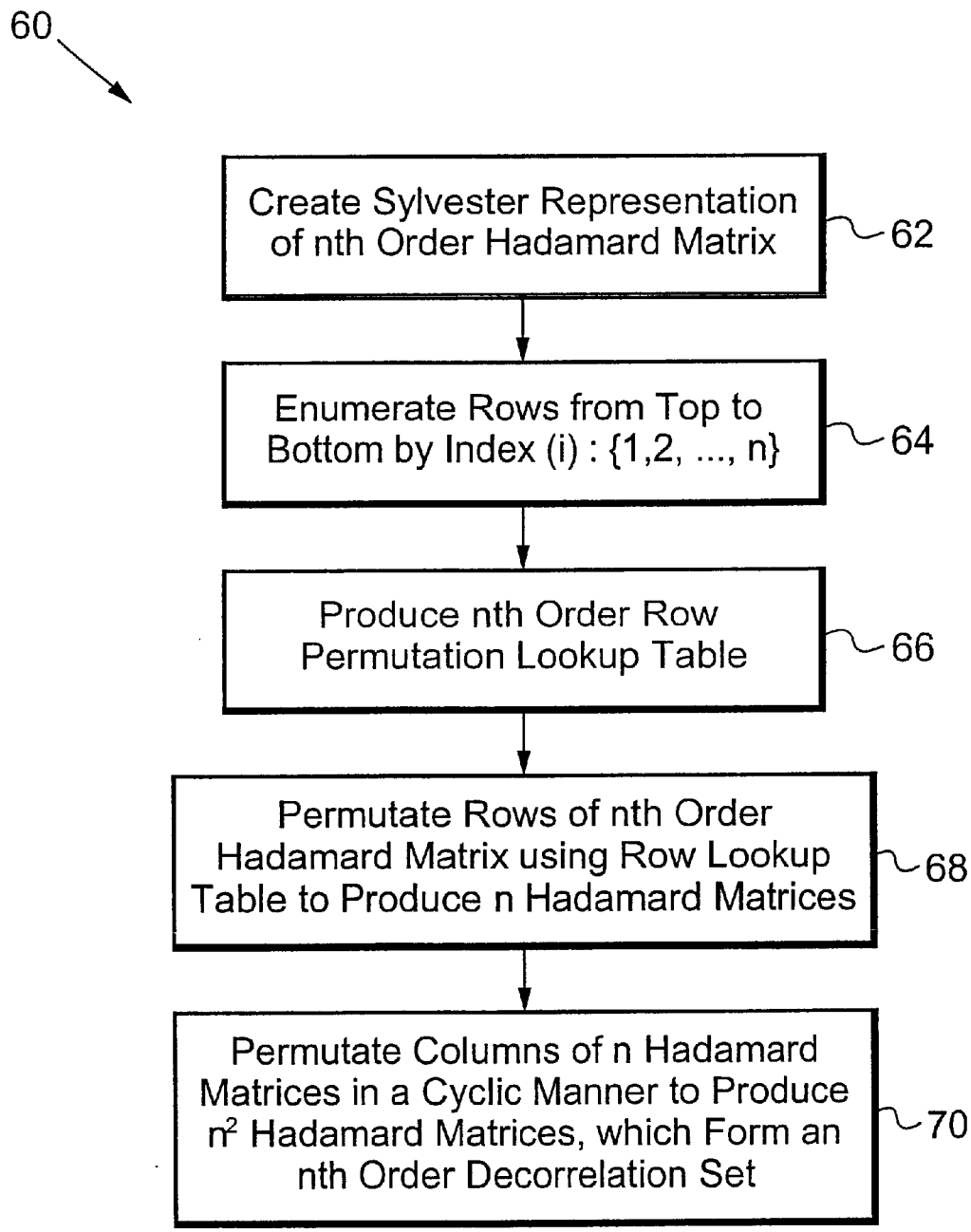
FIG. 8 illustrates, in block diagram format, a method of producing an nth order optimum decorrelation set of nth order Hadamard matrices of the present invention.

An nth order optimum decorrelation set production method, where n is selected from the set comprising {4, 8, 16, ... }, is illustrated as a block diagram in FIG. 8. The nth order optimum decorrelation set production method 60 includes first, second, third, fourth, and fifth method steps, 62, 64, 66, 68, and 70.

In the first method step 62, a Sylvester representation is preferably used to produce a first nth order Hadamard matrix. The Sylvester representation begins with a first order Hadamard matrix H(1) equal to one (1), referred to as a first order Sylvester representation Hadamard matrix: H(1)=(1). The Sylvester representation applies a first recursive relation on an mth order Sylvester representation matrix H(m) producing a twice previous order Sylvester representation Hadamard matrix H(2m) until an nth order Sylvester representation Hadamard matrix is reached, which is produced when 2m equals n. The first recursive relation follows:

$$H(2m) = \begin{pmatrix} H(m) & H(m) \\ H(m) & -H(m) \end{pmatrix}$$

FIG. 9 shows first, second, fourth, and eighth order Sylvester representation Hadamard matrices, 82, 84, 86, and 88, of the present invention.

In the second method step 64, rows of the nth order Sylvester representation Hadamard matrix are enumerated from top to bottom by row index i, which is given by the set of $\{1, 2, \ldots, n\}$. FIG. 10 shows the fourth order Sylvester representation Hadamard matrix 84 enumerated by the row index i.

In the third method step 66, a row permutation lookup table is produced. The row permutation lookup table is produced by applying a second recursive relation to a previous row permutation lookup table T(m) to produce a next row permutation lookup table T(2m). The second recursive relation follows:

$$T(2m) = \begin{pmatrix} T(m) & T(m) + 2^{m-1} \\ T(m) + 2^{m-1} & T(m) \end{pmatrix}$$

By applying the second recursive relation until 2m equals n, an nth order row permutation lookup table is produced. FIG. 11 shows a sixteenth order row permutation lookup table 90. The sixteenth order row permutation lookup table 90 contains an eighth order row permutation lookup table 92, which contains a fourth order row permutation lookup table 94, which in turn contains a second order row permutation lookup table 96.

Figure 12:
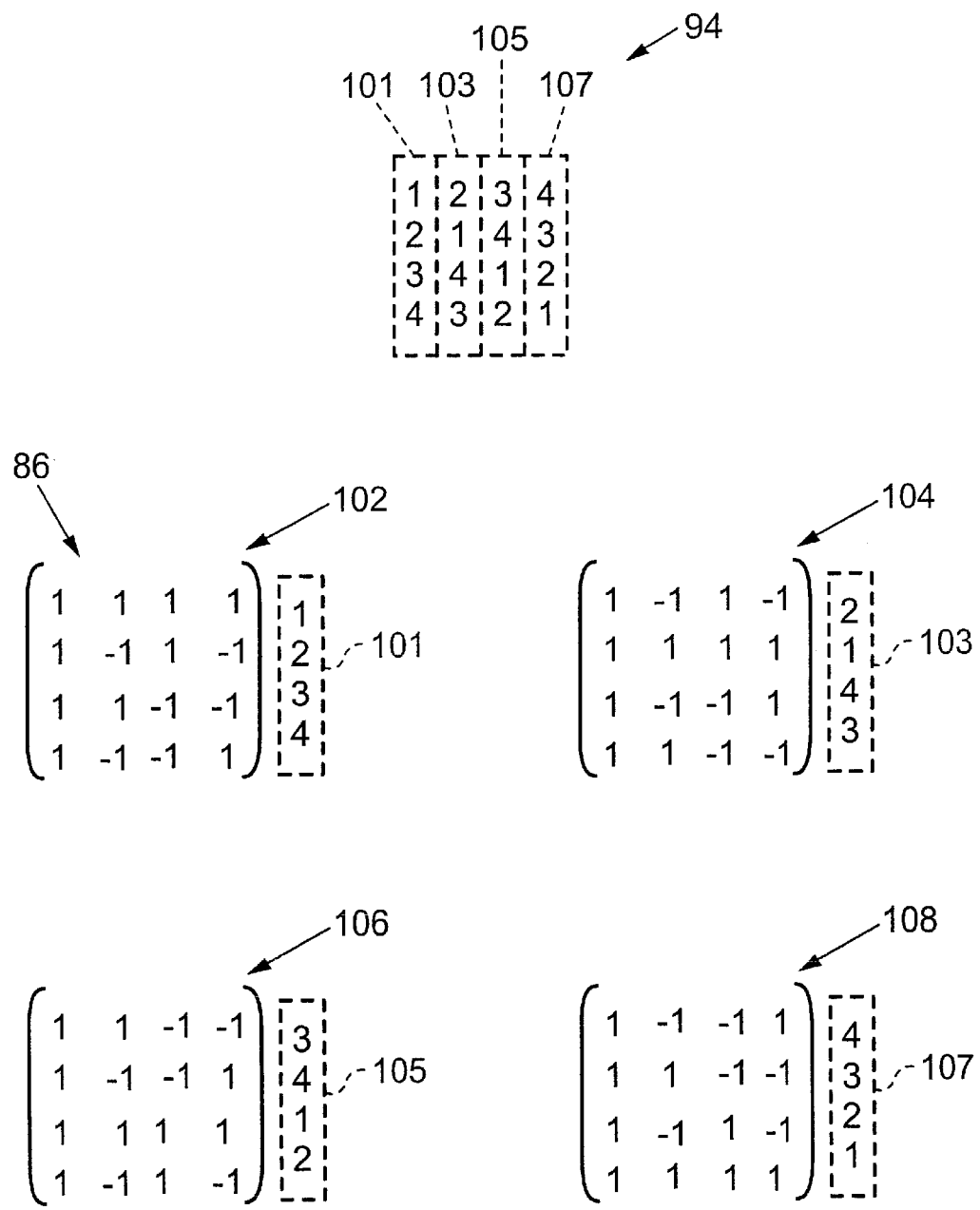
FIG. 12 shows a fourth order row permutation lookup table, the fourth order Sylvester representation Hadamard matrix, and second through fourth Hadamard matrices produced from the fourth order Sylvester representation Hadamard matrix using the fourth order row permutation lookup table of the present invention in mathematical representation.

In the fourth method step 68, the rows of the nth order Sylvester representation Hadamard matrix are permutated according to the nth order row permutation lookup table in order to produce n Hadamard matrices. FIG. 12 shows the fourth order row permutation lookup table 94, the fourth order Sylvester representation Hadamard matrix 86, and second, third, and fourth Hadamard matrices, 104, 106, and 108, produced by applying the row lookup table to the fourth order Sylvester representation Hadamard matrix 86. A first row permutation 101 shows that the fourth order Sylvester representation Hadamard matrix 86 is not permutated to produce a first Hadamard matrix 102. A second row permutation 103 is used to permutate the fourth order Sylvester representation Hadamard matrix 86 producing the second Hadamard matrix 104. A third row permutation 105 is used to permutate the fourth order Sylvester representation Hadamard matrix 86 producing the third Hadamard matrix 106. A fourth row permutation 107 is used to permutate the fourth order Sylvester representation Hadamard matrix 86 producing the fourth Hadamard matrix 108. Thus, the fourth order Sylvester representation Hadamard matrix 86, which is the first Hadamard matrix 102, and the second, third, and fourth Hadamard matrices, 104, 106, and 108, form a set of four Hadamard matrices.

Figure 13:
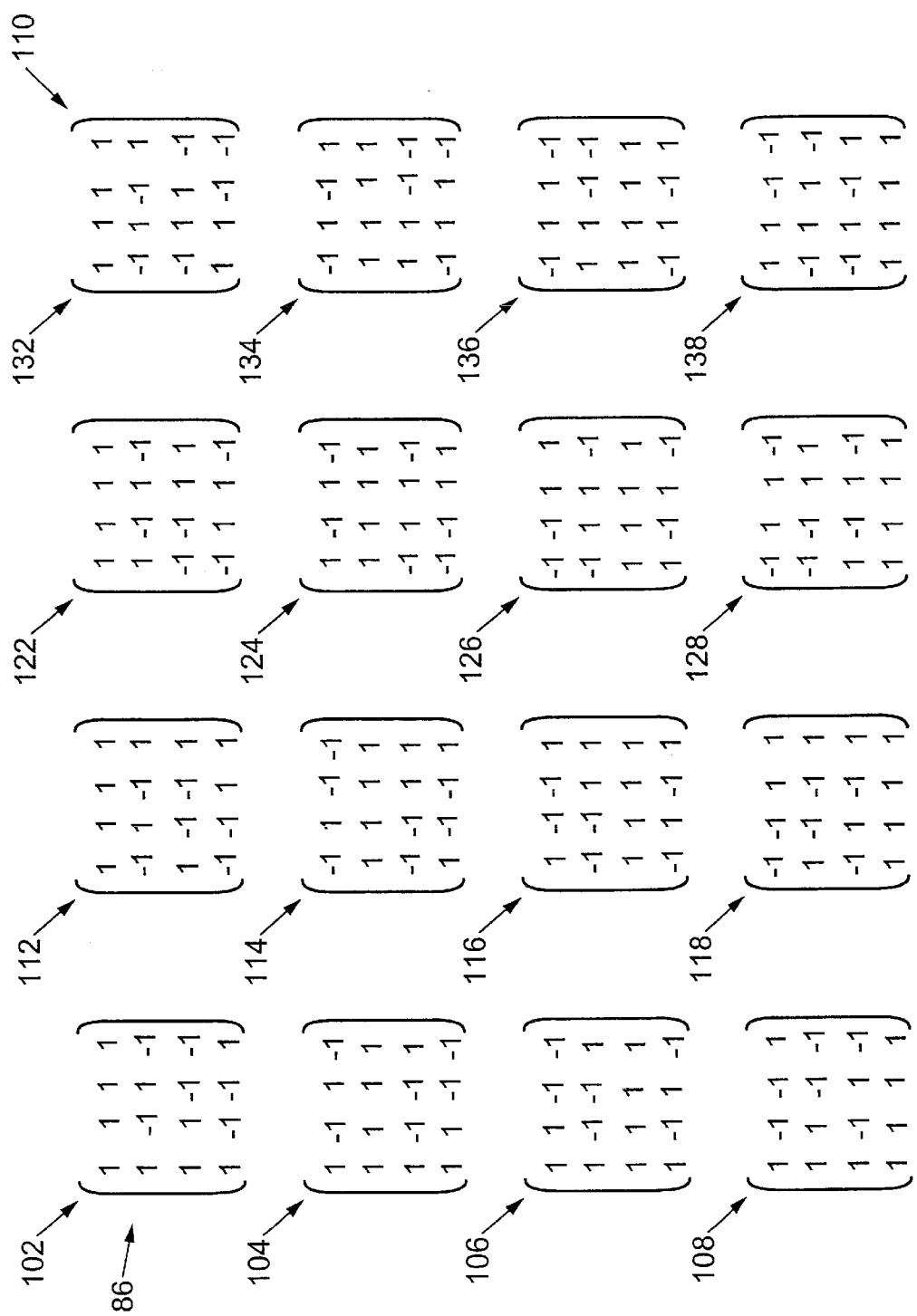
FIG. 13 shows a fourth order optimum decorrelation set of fourth order Hadamard matrices comprising sixteen Hadamard matrices of the present invention in mathematical representation.

In the fifth method step 70, columns of each of the n Hadamard matrices are permutated in a cyclic manner to produce $n^2$ Hadamard matrices, to form the optimum decorrelation set for the nth order Hadamard matrix. FIG. 13 shows the first through fourth Hadamard matrices, 102 . . . 108, cyclically permutated to produce sixteen Hadamard matrices 110, which is a fourth order optimum correlation set. Fifth through eighth Hadamard matrices, 112 . . . 118, are produced by moving a left column of the first through fourth Hadamard matrices, 102 . . . 108, to the right of a right column of the first through fourth Hadamard matrices. Ninth through twelfth Hadamard matrices, 122 . . . 128, are similarly produced from the fifth through eighth Hadamard matrices, 112 . . . 118. Thirteenth through sixteenth Hadamard matrices, 132 . . . 138, are similarly produced from the ninth through twelfth Hadamard matrices, 122 . . . 128, which completes the sixteen Hadamard matrices 110.

The nth order optimum decorrelation set production method 60 produces the nth order optimum decorrelation set. Alternatively, other optimum decorrelation sets can be produced. For example, by starting with a minus Sylvester representation of the nth order Hadamard matrix, a first alternative nth order optimum decorrelation set will be produced using the second through fifth method steps, 64 . . . 70, of the nth order optimum decorrelation set production method 60.

It can be shown that the sixteen Hadamard matrices 110 satisfy the decorrelation condition by applying two tests. The first test squares a particular term, for example a fourth row/third column term, from each of the sixteen Hadamard matrices 110 and sums the squares giving a value of 16. This corresponds to one of the squares of the amplitudes of the phase varied intensity. The second test takes a product of two different terms, for example a third row/second column term and a second row/fourth column term, from each of the sixteen Hadamard matrices 110 and sums the products giving a value of 0. This corresponds to one of the cross terms.

If the first and second tests are applied to the sixteen terms of the sixteen Hadamard matrices, it will be found that all of the squares sum to 16 and all of the products of two different terms sum to 0. Thus, the sixteen Hadamard matrices 110 each satisfy the decorrelation condition because each of the sixteen Hadamard matrices 110 provides the reduction in the cross terms without affecting the sum of the squares of the terms.

Figure 14:
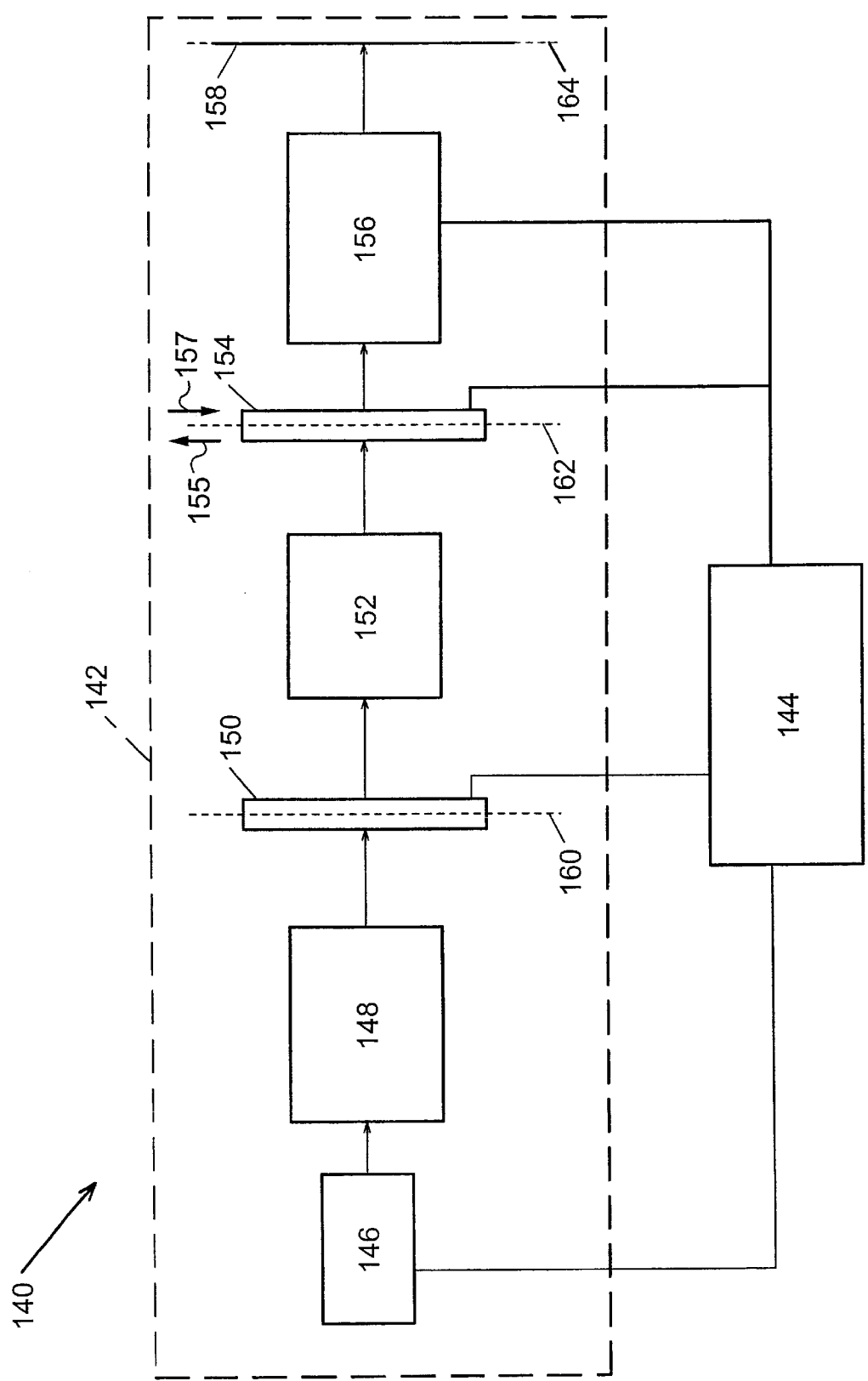
FIG. 14 schematically illustrates a display system of the present invention.

As indicated at the beginning of the description, the preferred embodiment of the present invention is the display system of the present invention, which is illustrated schematically in FIG. 14. The display system 140 includes display optics 142 and display electronics 144. The display optics 142 comprise a laser 146, illumination optics 148, a grating light valve 150, Schlieren optics 152, the preferred diffuser 154 of the present invention, projection and scanning optics 156, and a display screen 158. The display electronics 144 are coupled to the laser source 146, the grating light valve 150, the preferred diffuser 154, and the projection and scanning optics 156.

The display electronics 144 power the laser 146. The laser 146 emits a laser illumination. The illumination optics 48 focus the laser illumination onto the grating light valve 150. The grating light valve 150 is preferably located in a first image plane 160. The display electronics 144 control the grating light valve 150. The grating light valve 150 modulates the laser illumination forming reflected light or diffracted light. The reflected light and the diffracted light form a linear array of pixels. At this point, the linear array of pixels will not form an image. To form an image, either the reflected light or the diffracted light must be separated from the linear array of pixels. Preferably, the Schlieren optics 152 separates the reflected light from the diffracted light allowing at least plus one and minus one diffraction orders to pass the Schlieren optics 152. Alternatively, the Schlieren optics 152 separates the diffracted light from the reflected light allowing the reflected light to pass the Schlieren optics 152.

The Schlieren optics 152 form the linear array of pixels into a line image having a line image width at the preferred diffuser 154. The preferred diffuser 154 is preferably located in a second image plane 162. The preferred diffuser 154 preferably divides each of the pixels into sub-pixels and arranges relative phases of the sub-pixels of the linear array of pixels into first pixel patterns where the relative phases of the sub-pixels are selected from zero and pi (n) radians. Preferably, the pixels and sub-pixels correspond to the phase cells and the cell partitions of the earlier discussion. Alternatively, the pixels are larger than the phase cells. Further alternatively, but with less effectiveness, the pixels are smaller than the phase cells.

The display electronics 144 drive a scanning mirror of the projection and scanning optics 156. The projection and scanning optics 156 project the linear array of pixels onto the display screen 158 and scan the linear array of pixels across the display screen 158 to form a two dimensional array of pixels on the display screen 158, which is located in a third image plane 164. The two dimensional array of pixels appears as a two dimensional image to the eye 34 (not shown). The projection and scanning optics 156 repeatedly scan the linear of pixels as the grating light valve 150 modulates the linear array of pixels to form a changing two dimensional image.

The display system 140 reduces the speckle in the two dimensional image by employing the temporal phase variation and a scanning phase variation. The temporal phase variation is accomplished over a multiple of scans. The scanning phase variation is accomplished within each scan.

In the temporal phase variation, the projection and scanning optics 158 scan the linear array of pixels for the multiple of scans within the integration time of the eye 34. The display electronics 144 preferably drive the preferred diffuser 154 with a first movement 155 during the multiple of scans. The first movement causes the preferred diffuser 154 to rearrange the relative phases of the sub-pixels of the linear array of pixels into second pixel patterns where the relative phases of the sub-pixels are selected from zero and pi ($\pi$) radians for each scan of the multiple of scans. Preferably, at an end of the multiple of scars, the display electronics 144 drive the preferred diffuser 154 with a reverse movement 157 for a next multiple of scans. The reverse movement 157 initially moves the preferred diffuser 154 through a previous-to-last segment where the preferred diffuser applies previous-to-last pixel patterns. The reverse movement 157 continues until reaching the original position at an end of the next multiple of scans. Alternatively, at the end of the multiple of scans, the display electronics 144 drive the preferred diffuser 154 with a return movement which quickly returns the preferred diffuser 154 to an original position before the next multiple of scans begins.

In the scanning phase variation, the preferred diffuser 154 varies the phase across the linear array of pixels at the display screen 158 as the linear array of the pixels scans across the display screen 158. As the linear array of the pixels scans across the display screen 158 in a first scan, the phase varies orthogonally to the linear array of pixels producing the scanning phase variation. The scanning phase variation produces first uncorrelated speckle patterns as each linear array of pixels is formed on the display screen 158. The first uncorrelated speckle patterns reduce the speckle detected by the eye 34 by a scanning speckle reduction. The scanning speckle reduction is the subject of U.S. patent application Ser. No. 09/687,465, entitled, "Method and Apparatus for Reducing Laser Speckle," which is incorporated in its entirety by reference.

In a second scan for a particular linear array of pixels, the preferred diffuser has preferably moved parallel to the linear array of pixels by one pixel in order to rearrange the relative phases of the sub-pixels of the linear array of pixels into the second pixel patterns. In the second scan, when the particular linear array of pixels is imaged onto the display screen 158, the second pixel patterns and the scanning speckle reduction produce second uncorrelated speckle patterns. The second uncorrelated speckle patterns further reduce the speckle detected by the eye 34.

In successive scans for the particular linear array of pixels, the preferred diffuser 154 has preferably moved parallel to the linear array of pixels by an additional one pixel for each of the successive scans. Each of the successive scans produce successive pixel patterns. The successive pixel patterns and the scanning speckle reduction produce successive uncorrelated speckle patterns. The successive uncorrelated speckle patterns further reduce the speckle detected by the eye 34.

Each of the first, second, and successive scans takes a scan time. A total scan time is a sum of the scan times for the first, second, and successive scans. When the total scan time reaches the integration time of the eye 34, no further speckle reduction is obtained by applying further pixel patterns. Thus, a scanning speed provides a limit on a number of pixel patterns which can be applied to the linear array of pixels.

Figure 15:
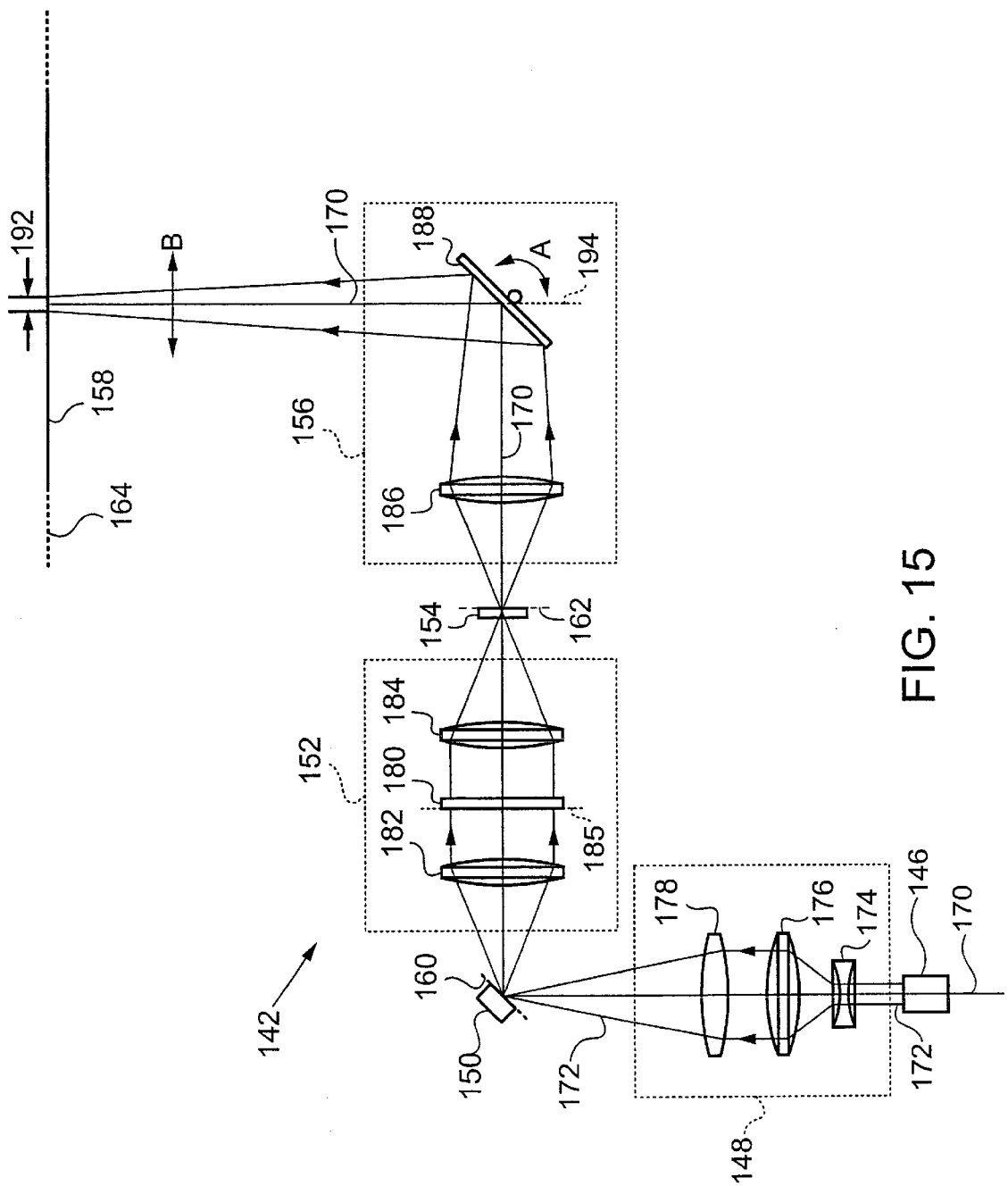
FIG. 15 illustrates a plan view of display optics employing the preferred diffuser of the present invention.

The display optics 142 of the present invention are further illustrated in FIGS. 15 and 16. FIG. 15 illustrates a plan view of the display optics 142. FIG. 16 illustrates an elevation view of the display optics 142, with the display optics 142 unfolded along an optic axis 170. The laser 146 emits the laser illumination 172. The illumination optics comprise a divergent lens 174, a collimation lens 176, and a cylindrical lens 178. The illumination optics 148 focus the laser illumination 172 onto the grating light valve 150 in a focus line having a focus width. Note that FIG. 15 illustrates the laser illumination 172 illuminating the grating light valve 150 with an angle of incidence of 45°. Ideally, the angle of incidence is a minimum angle of incidence which allows the laser illumination 172 to illuminate the grating light valve 150 while allowing the reflected and diffracted light to reach the Schlieren optics 152.

It will be readily apparent to one skilled in the art that other optics arrangements can be used to illuminate the grating light valve 150. It will also be readily apparent to one skilled in the art that depiction of lenses in the present invention is not limited to single component lenses and that any given lens can be replaced with a compound lens or a reflective optical element.

The grating light valve 150 modulates the laser illumination 172 as the linear array of pixels along the focus line, forming the reflected light R or the diffracted light, including the plus one and minus one diffraction orders, $D_{+1}$ and $D_{-1}$, for each pixel. Preferably, the grating light valve 150 produces a linear array of 1,080 pixels. Alternatively, the grating light valve 150 produces more or less than 1,080 pixels. Note that FIG. 16 illustrates the reflected light R and the plus one and minus one diffraction orders, $D_{+1}$ and $D_{-1}$, for two pixels for illustration purposes. If a given pixel is modulated to reflect light, the reflected light R will be present and the plus one and minus one diffraction orders, $D_{+1}$ and $D_{-1}$, will not be present. Alternatively, if the given pixel is modulated to diffract light, the plus one and minus one diffraction orders, $D_{+1}$ and $D_{-1}$, will be present and the reflected light R will not be present. In some instances it is desirable to modulate the given pixel to produce the reflected light R and the plus one and minus one diffraction orders, $D_{+1}$ and $D_{-1}$, in order to reduce a brightness of the given pixel in a resulting image, which provides a gray scale effect in the resulting image.

The Schlieren optics 152 include a Schlieren stop 180 located between first and second relay lenses, 182 and 184. The Schlieren stop 180 stops the reflected light R and allows the plus one and minus one diffraction orders, $D_{+1}$ and $D_{-1}$, to pass the Schlieren stop 180. The Schlieren stop 180 is preferably located in a first transform plane 185. Alternatively, the Schlieren stop 180 is located near the first transform plane 185.

The first and second relay lenses, 182 and 184, image the linear array of pixels as the line image in the second image plane 162, which is preferably within the preferred diffuser 154. Alternatively, the second image plane 162 is near the preferred diffuser 154. Dark and light pixels make up the line image. The dark pixels correspond to the pixels at the grating light valve 150 which are modulated to provide the reflected light R.

The light pixels correspond to the pixels at the grating light valve 150 which are modulated to provide the diffracted light including the plus one and minus one diffraction orders, $D_{+1}$ and $D_{-1}$.

The preferred diffuser 154 produces the scanning phase variation for each of the first, second, and successive scans and produces the temporal phase variation over the multiple of scans. This produces the first uncorrelated speckle patterns, the second uncorrelated speckle patterns, and the successive uncorrelated speckle patterns. Preferably, the preferred diffuser 154 comprises a rectangular array of the preferred diffuser phase cells. Preferably, the preferred diffuser phase cells comprise first and second optical path lengths which induce the relative phases of zero and pi ($\pi$) radians to the sub-pixels. Preferably, the preferred diffuser phase cells are arrange in linear units of eight of the preferred diffuser phase cells. Preferably, the linear units are arranged parallel to the linear array of pixels.

Preferably, the first and second optical path lengths of the preferred diffuser phase cells are arranged as eighth order Hadamard matrices where the plus one elements correspond to the zero phase shift and where the minus one elements correspond to the pi ($\pi$) radians phase shift. Preferably, the eight preferred diffuser phase cells correspond to eight decorrelated Hadamard matrices produced by the first, second, third, and fourth steps, 62, 64, 66, and 68, of the nth order optimum decorrelation set production method 60 (FIG. 8).

Alternatively, the eight decorrelated Hadamard matrices are chosen form the eighth order optimum decorrelation set of sixty four eighth order Hadamard matrices completed in the fifth method step 70 (FIG. 8). If the eight decorrelated Hadamard matrices are selected from the sixty four eighth order Hadamard matrices, it is important to not choose two eighth order Hadamard matrices which are cyclic permutations of each other. This is because the scanning phase variation accomplishes the cyclic permutation as the particular linear array of pixels is formed on the display screen 158.

The projection and scanning optics 156 comprise a projection lens 186 and the scanning mirror 188. The projection lens 186, via the scanning mirror 188, projects the line image 190 onto the display screen 158. The scanning mirror 188 is preferably located at about a second transform plane 194. The scanning mirror 188 moves with a first scan motion A and, thus, scans the line image 190 across the display screen 158 with a second scan motion B. Preferably, the first scan motion A is a sawtooth scan motion where a first part of a scan cycle illuminates the display screen 158 and a second part of the scan cycle returns the scanning mirror 188 back to a beginning of the scan cycle. By repeatedly scanning the line image 190 across the display screen 158, a two dimensional image is formed on the display screen 158.

It will be readily apparent to one skilled in the art that other scan motions can be used to scan the line image 190 across the display screen 158. It will also be readily apparent to one skilled in the art that a transmissive scanning device such as an objective scanner having zero optical power can replace the scanning mirror 188.

As the line image 190 scans across the display screen 158, the grating light valve 150 modulates the linear array of pixels thus producing the two dimensional image made up of the two dimensional array of pixels. For a high definition television (HDTV) format, the grating light valve 150 modulates 1,920 times as the line image 190 scans across the display screen 158. Thus, the grating light valve 150 preferably produces a 1,920 by 1,080 rectangular array forming the two dimensional image for the HDTV format. For other picture formats, the grating light valve 150 modulates more or less than the 1,920 times as the line image 90 scans across the display screen 158 depending upon which of the other picture formats is being displayed.

Preferably, the preferred diffuser 154 is moved with a sinusoidal motion. A first half period of the sinusoidal motion corresponds to the first movement 155 and a second half period of the sinusoidal motion corresponds to the reverse movement 157. While the sinusoidal motion does not apply the eight pixel patterns for exactly equal duration, it is preferred nonetheless for ease of implementation. To implement the sinusoidal motion, a simple harmonic oscillator will suffice. Alternatively, the preferred diffuser 154 is moved with a sawtooth motion Although the sawtooth motion can be employed to apply the eight pixel patterns for almost exactly equal duration, it is less preferred because it is more complicated to implement than the sinusoidal motion.

The display optics 142 depicted in FIGS. 14, 15, and 16 produce a monochrome image. Color display optics comprise the display optics 142, two additional lasers, two additional illumination optics, two additional grating light valve's, and a dichroic filter group. In the color display optics, red, green, and blue lasers illuminate the three grating light valve's producing red, green, and blue linear arrays of pixels. The dichroic filter group combines the reflected and diffracted light from the three grating light valves and directs the reflected and diffracted light to the Schlieren optics 152. Alternatively, in the color display optics, the dichroic filter group combines the red, green, and blue laser illuminations to sequentially illuminate a single grating light valve.

In the color display optics, the preferred diffuser 154 produces the first, second, and successive uncorrelated speckle patterns for each of the red, green, and blue linear arrays of pixels. Since it is inherent to the red, green, and blue laser illuminations that each has a particular light wavelength imposing an optical path variation to one of the red, green, or blue linear arrays of pixels to produce the pi ($\pi$) phase shift results in phase shifts the other two of the red, green, or blue linear arrays of pixels not equal to the pi ($\pi$) phase shift. Thus, in practice it is preferable to configure the preferred diffuser 154 for the light wavelength which produces the most speckle. Alternatively, the preferred diffuser 154 is configured to induce a pi ($\pi$) phase shift for the green linear array of pixels since the green laser illumination has a wavelength between that of the red and blue laser illuminations.

Figure 17A:
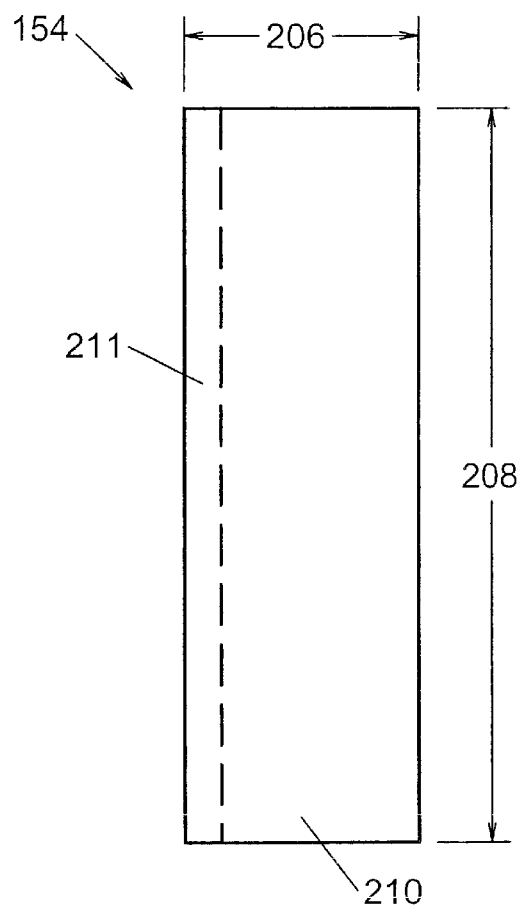
FIGS. 17A and 17B illustrate the preferred diffuser of the present invention.
Figure 17B:
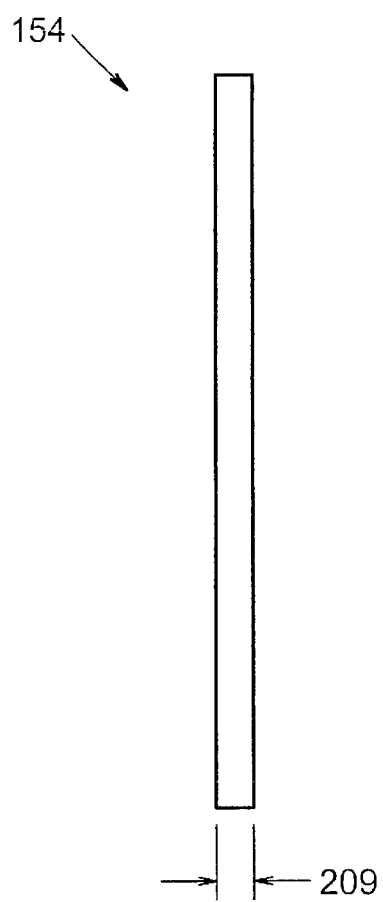

The preferred diffuser 154 is further illustrated in FIGS. 17A and 17B. The preferred diffuser 154 comprises a transmissive diffuser having a width 206, a height 208, and a thickness 209, a diffuser surface 210, and an alignment surface 211. Preferably, the width 206 is 10 mm, the height 208 is 35 mm, and the thickness 209 is 1 mm, which provide a convenient handling size and redundancy for a 27.5 mm line image of 1,080 pixels, each pixel being about 25.5 $\mu$m at the preferred diffuser 154. Alternatively, the width 206, the height 208, and the thickness 209 are of different dimensions which are sufficient for the line image at the preferred diffuser 154.

The width 206 of the preferred diffuser 154 is preferably divided into the diffuser surface 210 and the alignment surface 211. The diffuser surface 210 preferably comprises 8 mm of the width 206 and the alignment surface 211 preferably comprises 2 mm of the width 206. The alignment surface 211 has a constant thickness and is used during an alignment of the display optics 142 (FIGS. 14, 15, and 16).

Figure 17C:
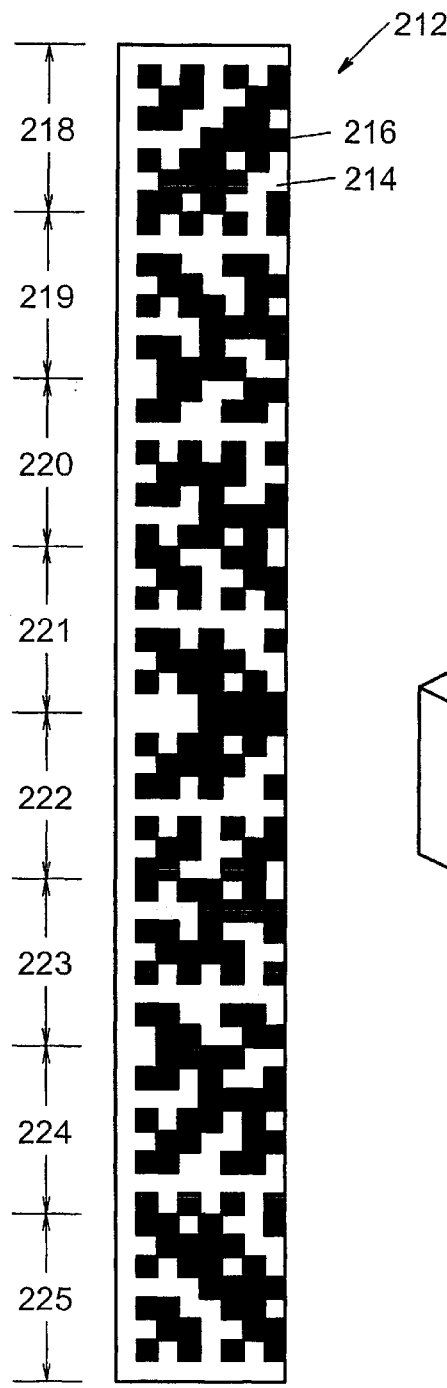
FIG. 17C schematically illustrates a portion of the preferred diffuser surface of the present invention.

The diffuser surface 210 preferably comprises repeating patterns of the linear units of eight of the preferred diffuser phase cells arranged parallel to the height 208. The linear units of the eight of the preferred diffuser phase cells correspond to the eight decorrelated Hadamard matrices. FIG. 17C schematically illustrates a single unit of the eight diffuser phase cells 212 where white areas 214 indicate cell partitions having a zero relative phase shift and black areas 216 indicate cell partitions having a pi ($\pi$) radians phase shift. A first diffuser phase cell 218 corresponds to an eighth order Sylvester representation Hadamard matrix. Second through eighth diffuser phase cells, 219–225, correspond to Hadamard matrices produced in the fourth method step 68 of the nth order optimum decorrelation set production method 60 (FIG. 8). Preferably, the first through eighth diffuser phase cells are 24 $\mu$m square. Alternatively, the diffuser phase cells are up to 25.5 $\mu$m square. Further alternatively, the diffuser phase cells are smaller than 24 $\mu$m square.

Figure 17D:
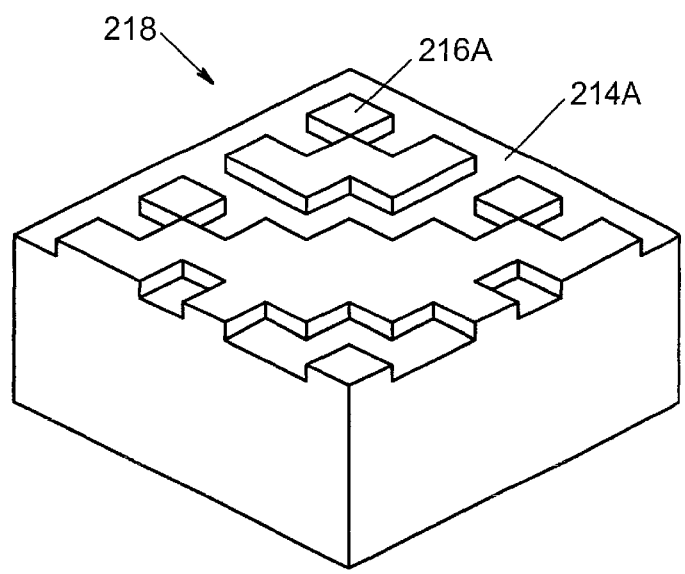
FIG. 17D illustrates a first diffuser phase cell of the preferred diffuser of the present invention.

The first diffuser phase cell 218 is further illustrated in FIG. 17D. The first diffuser phase cell 218 includes first and second surfaces, 214A and 216A, corresponding to the white and black areas, 214 and 216 (FIG. 17C).

Figure 18:
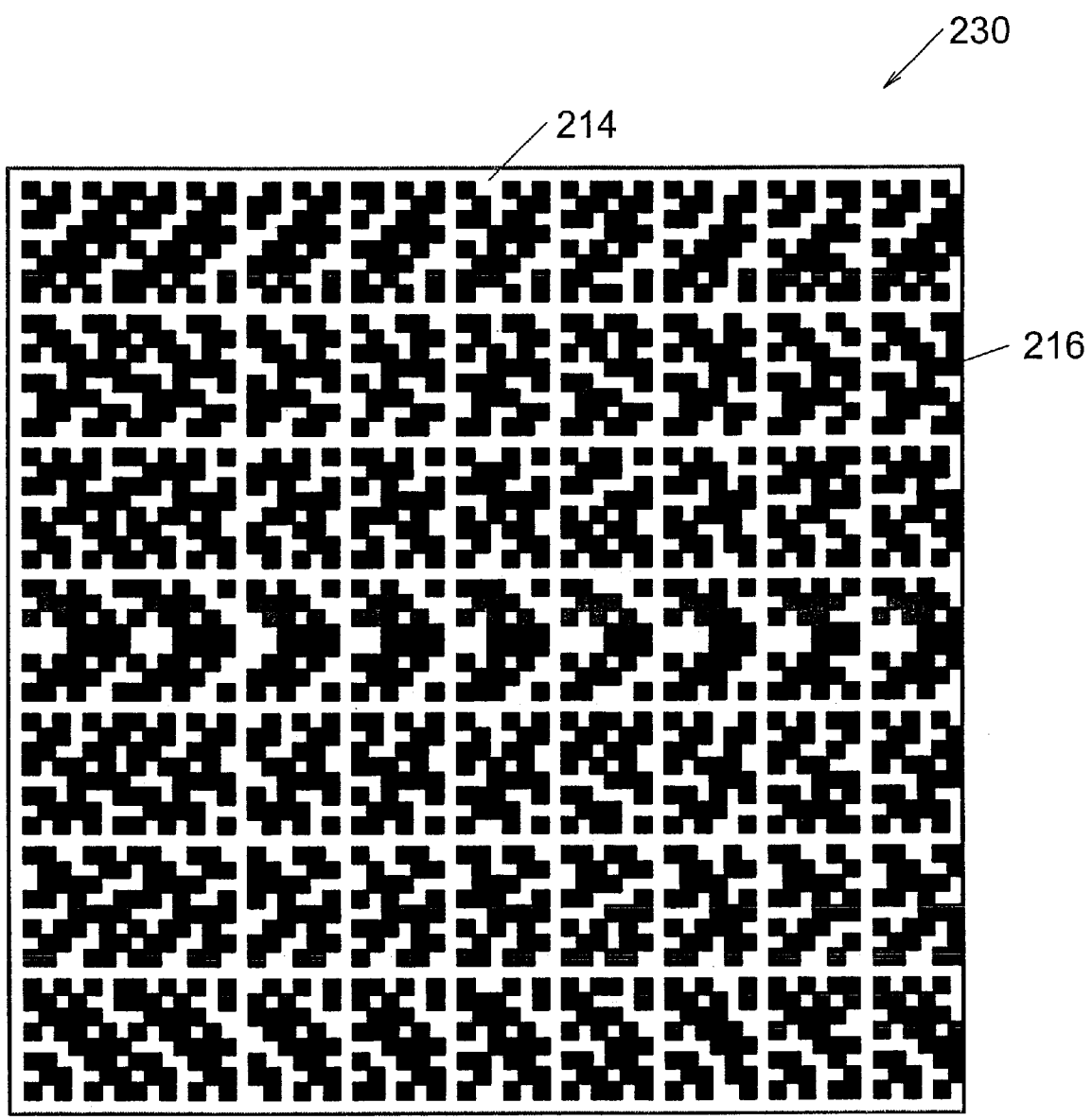
FIG. 18 schematically illustrates a portion of an alternative diffuser surface of the present invention.

An alternative diffuser surface of the preferred diffuser 154 comprises repeating patterns of square units of sixty four diffuser phase cells corresponding to sixty four decorrelated Hadamard matrices that form an eighth order optimum decorrelation set. FIG. 18 schematically illustrates a single unit of the sixty four diffuser phase cells 218 where the white areas 214 indicate cell partitions having a zero relative phase shift and the black areas 216 indicate cell partitions having a pi ($\pi$) radians phase shift.

The preferred diffuser 154 is preferably fabricated by etching a photolithographic pattern into the fused silica having an index of refraction n of 1.46. For this index of refraction and a laser illumination of 532 nm, a height difference between the first and second surfaces, 214A and 216A, is preferably 575 nm. Preferably, the preferred diffuser 154 includes an antireflection coating. The preferred antireflection coating is a 400–700 nm BBAR (broadband anti-reflective) coating.

A series of tests were performed to evaluate the preferred diffuser 154. Previous testing established that a line illumination projected onto a display screen without scanning and without use of the preferred diffuser 154 resulted in speckle contrast within a range of 60 to 65%. In a first test, the line illumination was projected onto the display screen and scanned across the display screen without use of the preferred diffuser 154. The first test indicated that the speckle contrast was reduced to 38%. Thus, the previous testing and the first test indicated that scanning of the line illumination reduced the speckle by a speckle reduction factor of within the range of 1.6 to 1.7.

In a second test, the line illumination was projected onto and scanned across the display screen and the preferred diffuser was employed without a diffuser motion. The second test indicated that the speckle contrast was reduced to 18%. In a third test, the line illumination was projected onto and scanned across the display screen and the preferred diffuser was employed with the diffuser motion. The third test indicated that the speckle contrast was reduced to 8.5%. Thus, the first and third tests indicated that presence and movement of the preferred diffuser 154 reduces the speckle by the speckle reduction factor of 4.5.

It is important to recognize that the speckle reduction factor of 4.5 indicated by the first and third tests does not provide a diffuser speckle reduction. This is because there is a correlation between the scan speckle reduction and the diffuser speckle reduction. In other words, the uncorrelated speckle patterns produced by the scanning of the line illumination are also produced by the preferred diffuser 154. Thus, the diffuser speckle reduction is indicated by comparing the previous testing to the third test. Looking to the previous testing and the third test indicates that the preferred diffuser 154 reduces the speckle by a speckle reduction factor of within a range of 7.1 to 7.6, which is close to a theoretical speckle reduction of $\sqrt{64}=8$.

First alternative display optics of the present invention utilize a linear array of reflective light valves. Referring to FIGS. 15 and 16, such a system would replace the grating light valve 150 with the linear array of the reflective light valves and would not use the Schlieren stop 180. In the first alternative display optics, a particular reflective light valve produces the dark pixel by reflecting the laser illumination away from the first relay lens 182. In the first alternative display optics, the particular reflective light valve produces the light pixel by reflecting the laser illumination to the first relay lens 182.

Second alternative display optics of the present invention utilize a linear array of transmissive light valves. Referring to FIGS. 15 and 16, such a system would replace the grating light valve 150 with the linear array of the transmissive light valves and would not use the Schlieren stop 180. In the second alternative display optics, a particular transmissive light valve produces the dark pixel by not transmitting the laser illumination to the first relay lens 182. In the second alternative display optics, the particular reflective light valve produces the light pixel by transmitting the laser illumination to the first relay lens 182.

Third alternative display optics of the present invention replace the Schlieren optics with a reflective Schlieren optics. The reflective Schlieren optics preferably utilize an Offfier relay. The Offfier relay includes a concave mirror and a convex mirror. The convex mirror includes a rectangular slit. The reflected light R and the diffracted light, including the plus one and minus one diffraction orders, $D_{+1}$ and $D_{-1}$, reflect from the concave mirror to the convex mirror. The reflected light R passes through the rectangular slit. The plus one and minus one diffraction orders, $D_{+1}$ and $D_{-1}$, reflect from the convex mirror back to the concave mirror. Subsequently, the concave mirror reflects the plus one and minus one diffraction orders, $D_{+1}$ and $D_{-1}$, to the wavefront modulator 154.

Fourth alternative display optics of the present invention comprises a raster scan of a laser spot to form the two dimensional image where a fourth alternative diffuser divides the laser spot into the sub-pixels and applies the temporal phase variation to the sub-pixels between successive scans.

Fifth alternative display optics of the present invention comprises a two dimensional array light modulator which modulates the laser illumination to produce the two dimensional image comprising a two dimensional array of pixels. In the fifth alternative display optics, a fifth alternative diffuser divides each of the pixels of the two dimensional array of pixels into the sub-pixels and applies the temporal phase variation to the sub-pixels of each pixel.

Figure 19:
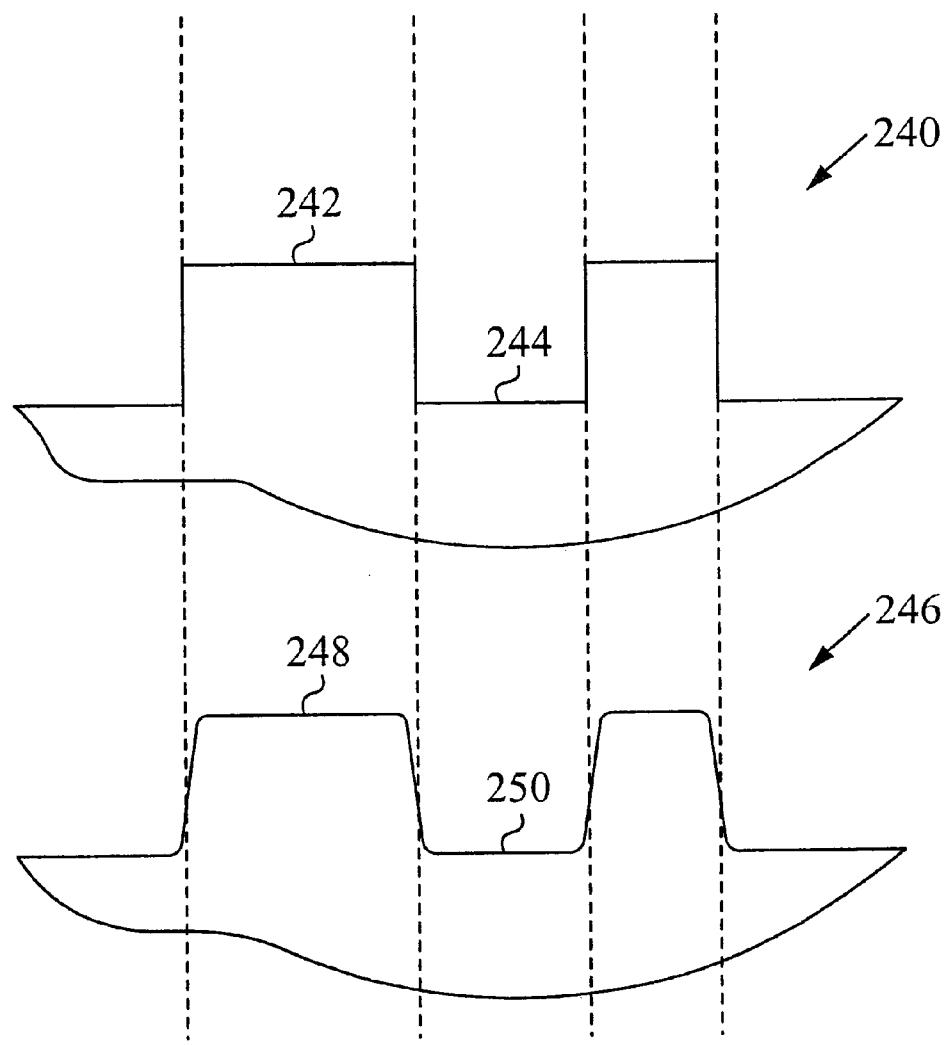
FIG. 19 illustrates a binary phase step surface and a gradual transition phase step surface of the present invention.

A sixth alternative diffuser of the present invention utilizes gradual transition phase steps rather than binary phase steps. The binary phase steps and the gradual transition phase steps are illustrated in FIG. 19. The binary phase steps 240 abruptly transition from a first surface 242 to a second surface 244 while the gradual transition phase steps 206 gradually transition from a third surface 248 to a fourth surface 250. By utilizing the gradual transition phase steps, higher order diffraction is reduced which increases an optical throughput.

While the preferred embodiment of the present invention is the display system 140 (FIG. 14), the present invention is also appropriate for reducing speckle in other applications where a laser illumination illuminates a diffuse surface. The other applications include coherent imaging, coherent microscopy, coherent tomography, coherent remote sensing, and laser based semiconductor wafer inspection.

Further, while the present invention has been described in terms of square phase cells and square cell partitions, the present invention also includes non-square phase cells and non-square cell partitions.

It will be readily apparent to one skilled in the art that other various modifications may be made to the preferred embodiment without departing from the spirit and scope of the invention as defined by the appended claims.

I claim:

1. A method of reducing speckle comprising:
   a. dividing a laser illuminated area into phase cells;
   b. subdividing the phase cells into a number of cell partitions; and
   c. applying a temporal phase variation to the cell partitions within an integration time of an intensity detector viewing the laser illuminated area.

2. The method of claim 1 wherein each of the phase cells comprise four of the cell partitions.

3. The method of claim 2 wherein the step of dividing the phase cells into the cell partitions applies a first relative phase of zero to first, second, and third cell partitions and applies a second relative phase of pi radians to a fourth cell partition.

4. The method of claim 3 wherein the step of applying the temporal phase variation to the cell partitions comprises cyclically exchanging the first and second relative phases between the third and fourth cell partitions, then between the second and third cell partitions, and then between the first and second cell partitions.

5. The method of claim 1 wherein each of the phase cells comprise a square of an integer multiple of four of the cell partitions.

6. The method of claim 1 wherein the step of subdividing the phase cells into the cell partitions comprises arranging the cell partitions in a first Hadamard matrix pattern.

7. The method of claim 6 wherein the first Hadamard matrix pattern comprises first and second cell partitions, the first and second cell partitions applying first and second relative phase variations of zero and pi radians, respectively, to the laser illuminated area.

8. The method of claim 7 wherein the step of applying the temporal phase variation comprises arranging the cell partitions in a second Hadamard matrix pattern.

9. The method of claim 8 wherein the first and second Hadamard matrix patterns correspond to first and second Hadamard matrices and further wherein the first and second Hadamard matrices satisfy a decorrelation condition.

10. The method of claim 9 wherein the step of applying the temporal phase variation further comprises arranging the cell partitions in additional Hadamard matrix patterns corresponding to additional Hadamard matrices such that the first, second, and additional Hadamard matrices form an optimum decorrelation set.

11. The method of claim 10 wherein the optimum decorrelation set of the first, second, and additional Hadamard matrices are determined using an nth order optimum decorrelation set production method comprising the steps of:
   a. creating an nth order Sylvester representation of an nth order Hadamard matrix;
   b. enumerating rows by a row index;
   c. producing an nth order row permutation lookup table;
   d. permutating rows of the nth order Hadamard matrix using the nth order row permutation lookup table to produce n Hadamard matrices; and
   e. permutating columns of the n Hadamard matrices in a cyclic manner to produce $n^2$ Hadamard matrices.

12. The method of claim 1 wherein the intensity detector resolves the laser illuminated area into resolution spots and further wherein the resolution spots comprise a size of at least about a phase cell size.

13. The method of claim 1 wherein the intensity detector viewing the laser illuminated area detects a speckle reduction of proximately a square root of the number of cell partitions.

14. The method of claim 13 wherein a measurement of the speckle reduction of proximately the square root of the number of the cell partitions accounts for other correlated speckle reduction methods simultaneously employed.

15. An apparatus for displaying a two dimensional image on a display screen comprising:
   a. a light modulator configured such that in operation a laser illumination illuminates the light modulator and further such that in operation the light modulator modulates the laser illumination to form an array of pixels;
   b. a first optical arrangement optically coupled to the light modulator and configured such that in operation the first optical arrangement images the array of pixels in a first image plane;
   c. a diffuser located at about the first image plane such that in operation the diffuser divides each pixel of the array of pixels into a number of sub-pixels and applies a temporal phase variation to the sub-pixels of each pixel; and
   d. a second optical arrangement optically coupled to the diffuser, the second optical arrangement configured such that in operation the second optical arrangement projects the array of pixels onto the display screen to produce the two dimensional image.

16. The apparatus of claim 15 wherein the array of pixels comprises a two dimensional array of pixels.

17. The apparatus of claim 15 wherein the array of pixels comprises a linear array of pixels.

18. The apparatus of claim 17 wherein the light modulator comprises a diffractive light modulator.

19. The apparatus of claim 18 wherein the diffractive light modulator comprises a grating light valve.

20. The apparatus of claim 17 wherein the second optical arrangement comprises a projection lens and a scanning device such that the projection lens projects the linear array of pixels onto the display screen and further such that the scanning device scans the linear array of pixels over the display screen to produce the two dimensional image.

21. The apparatus of claim 15 wherein the diffuser comprises diffuser phase cells and further wherein the diffuser phase cells comprise cell partitions.

22. The apparatus of claim 21 wherein the diffuser cell partitions induce first and second relative phase variations of zero and pi radians, respectively.

23. The apparatus of claim 21 wherein the cell partitions of each diffuser phase cell comprise a square matrix of the cell partitions, the square matrix comprising a Hadamard matrix where a first matrix element applies a first relative phase of zero and a second matrix element applies a second relative phase of pi radians.

24. The apparatus of claim 15 wherein the array of pixels comprises a single pixel and further wherein a raster scan forms the two dimensional image on the display screen from the single pixel.

25. The apparatus of claim 15 wherein the diffuser reduces the speckle observed in the two dimensional image.

26. The apparatus of claim 25 wherein the diffuser reduces the speckle by a speckle reduction of proximately the square root of the number of the sub-pixels.

27. The apparatus of claim 26 wherein a measurement of the speckle reduction accounts for other correlated speckle reduction methods simultaneously employed.

28. An apparatus for reducing speckle observed by an intensity detector when the intensity detector views a laser illuminated area comprising:
   a. a diffuser optically coupled to a laser illumination, the diffuser dividing resolution spots observed by the intensity detector into a number of sub-resolution spots, the number of sub-resolution spots comprising at least four of the sub-resolution spots; and
   b. means for applying a temporal phase variation to the sub-resolution spots of each resolution spot.

29. The apparatus of claim 28 wherein the intensity detector detects a speckle reduction of proximately a square root of the number of sub-resolution spots.

30. The apparatus of claim 29 wherein a measurement of the speckle reduction accounts for other correlated speckle reduction methods simultaneously employed.

31. An apparatus for reducing speckle observed by an intensity detector when the intensity detector views a laser illuminated area comprising:
   a. means for dividing resolution spots observed by the intensity detector into a number of sub-resolution spots, the number of sub-resolution spots comprising at least four of the sub-resolution spots; and
   b. means for applying a temporal phase variation to the sub-resolution spots observed by the intensity detector.

32. The apparatus of claim 31 wherein the intensity detector detects a speckle reduction of proximately a square root of the number of sub-resolution spots.

33. The apparatus of claim 32 wherein a measurement of the speckle reduction accounts for other correlated speckle reduction methods simultaneously employed.

34. A diffuser for reducing speckle produced by a laser illumination illuminating a surface where the surface is viewed by an intensity detector comprising:
   a. a first diffuser cell comprising first and second cell partitions configured to induce first and second relative phases of zero and pi radians, respectively, the first and second cell partitions arranged in a first Hadamard matrix pattern corresponding to a first Hadamard matrix having a matrix order of at least a second order; and
   b. a second diffuser cell comprising the first and second cell partitions arranged in a second Hadamard matrix pattern corresponding to a second Hadamard matrix having the matrix order where the first and second Hadamard matrices satisfy a decorrelation condition.

35. The diffuser of claim 34 further comprising a third diffuser cell comprising the first and second cell partitions arranged in a third Hadamard matrix pattern corresponding to a third Hadamard matrix having the matrix order where the first, second, and third Hadamard matrices satisfy the decorrelation condition.

36. The diffuser of claim 35 further comprising a fourth diffuser cell comprising the first and second cell partitions arranged in a fourth Hadamard matrix pattern corresponding to a fourth Hadamard matrix having the matrix order where the first, second, third, and fourth Hadamard matrices satisfy the decorrelation condition.

37. The diffuser of claim 34 wherein the diffuser comprises a transmissive diffuser.

38. The diffuser of claim 34 wherein the diffuser comprises a reflective diffuser.

39. The diffuser of claim 34 wherein the diffuser comprises an electrooptic diffuser.

40. A diffuser for reducing speckle produced by a laser illumination illuminating a surface where the surface is viewed by an intensity detector comprising:
   a. a first diffuser cell comprising first through fourth cell partitions, the first, second, and third cell partitions configured to apply a first relative phase of zero to the laser illumination illuminating the surface, the fourth cell partition configured to apply a second relative phase of pi radians to the laser illumination illuminating the surface;
   b. a second diffuser cell comprising the first through fourth cell partitions, the first, second, and fourth cell partitions configured to apply the first relative phase to the laser illumination illuminating the surface, the third cell partition configured to apply the second relative phase to the laser illumination illuminating the surface;
   c. a third diffuser cell comprising the first through fourth cell partitions, the first, third, and fourth cell partitions configured to apply the first relative phase to the laser illumination illuminating the surface, the second cell partition configured to apply the second relative phase to the laser illumination illuminating the surface; and
   d. a fourth diffuser cell comprising the first through fourth cell partitions, the second, third, and fourth cell partitions configured to apply the first relative phase to the laser illumination illuminating the surface, the first cell partition configured to apply the second relative phase to the laser illumination illuminating the surface.

41. The diffuser of claim 40 wherein the first through fourth diffuser cells comprise first through fourth Hadamard matrix patterns of the first through fourth cell partitions and further wherein the first through fourth Hadamard matrix patterns correspond to first through fourth Hadamard matrices which satisfy a decorrelation condition.

* * * * *